US012793402B2

(12) United States Patent
Levine et al.

(10) Patent No.: US 12,793,402 B2
(45) **Date of Patent: *Nov. 10, 2026**

(54) MACHINE LEARNING METHODS AND APPARATUS RELATED TO PREDICTING MOTION(S) OF OBJECT(S) IN A ROBOT'S ENVIRONMENT BASED ON IMAGE(S) CAPTURING THE OBJECT(S) AND BASED ON PARAMETER(S) FOR FUTURE ROBOT MOVEMENT IN THE ENVIRONMENT

(71) Applicant: GOOGLE LLC, Mountain View, CA (US)

(72) Inventors: Sergey Levine, Berkeley, CA (US); Chelsea Finn, Berkeley, CA (US); Ian Goodfellow, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,185

(22) Filed: Nov. 11, 2021

(65) Prior Publication Data

US 2022/0063089 A1 Mar. 3, 2022

Related U.S. Application Data

(63) Continuation of application No. 15/596,103, filed on May 16, 2017, now Pat. No. 11,173,599.

(Continued)

(51) Int. Cl.
*G06N 3/084* (2023.01)
*B25J 9/16* (2006.01)

(Continued)

(52) U.S. Cl.
CPC .............. *G06V 10/82* (2022.01); *B25J 9/161* (2013.01); *B25J 9/1656* (2013.01); *B25J 9/1697* (2013.01);

(Continued)

(58) Field of Classification Search
CPC ...... G06V 10/82; G06V 10/454; G06V 40/20; B25J 9/161; B25J 9/1656; B25J 9/1697;

(Continued)

(56) References Cited

U.S. PATENT DOCUMENTS 6,278,906 B1 8/2001 Piepmeier
11,173,599 B2 11/2021 Levine et al.

(Continued)

FOREIGN PATENT DOCUMENTS

CN 1457287 11/2003
CN 101482923 7/2009

(Continued)

OTHER PUBLICATIONS

Pinto L, Gupta A. Supersizing self-supervision: Learning to grasp from 50k tries and 700 robot hours. In2016 IEEE international conference on robotics and automation (ICRA) May 16, 2016 (pp. 3406-3413). IEEE. (Year: 2016).*

(Continued)

*Primary Examiner* — Henry Nguyen
(74) *Attorney, Agent, or Firm* — Gray Ice Higdon

(57) ABSTRACT

Some implementations of this specification are directed generally to deep machine learning methods and apparatus related to predicting motion(s) (if any) that will occur to object(s) in an environment of a robot in response to particular movement of the robot in the environment. Some implementations are directed to training a deep neural network model to predict at least one transformation (if any), of an image of a robot's environment, that will occur as a result of implementing at least a portion of a particular movement of the robot in the environment. The trained deep neural network model may predict the transformation based (Continued)

on input that includes the image and a group of robot movement parameters that define the portion of the particular movement.

20 Claims, 10 Drawing Sheets

Related U.S. Application Data

(60) Provisional application No. 62/339,734, filed on May 20, 2016.

(51) Int. Cl.
*G05B 13/02* (2006.01)
*G06N 3/008* (2023.01)
*G06T 7/73* (2017.01)
*G06V 10/44* (2022.01)
*G06V 10/82* (2022.01)
*G06V 40/20* (2022.01)

(52) U.S. Cl.
CPC ........... *G05B 13/027* (2013.01); *G06N 3/008* (2013.01); *G06N 3/084* (2013.01); *G06T 7/74* (2017.01); *G06V 10/454* (2022.01); *G06V 40/20* (2022.01); *G05B 2219/39289* (2013.01); *G06T 2207/10024* (2013.01); *G06T 2207/20081* (2013.01); *G06T 2207/20084* (2013.01); *G06T 2207/30164* (2013.01)

(58) Field of Classification Search
CPC ........ G05B 13/027; G05B 2219/39289; G06F 18/00; G06N 3/008; G06N 3/045; G06N 3/084; G06T 7/74; G06T 2207/10024; G06T 2207/20081; G06T 2207/20084; G06T 2207/30164
See application file for complete search history.

(56) References Cited

U.S. PATENT DOCUMENTS

| | | | | |
|---|---|---|---|---|
| 2002/0016782 | A1 | 2/2002 | Cooper | |
| 2006/0155664 | A1* | 7/2006 | Morikawa | G06N 5/02 706/47 |
| 2011/0238211 | A1* | 9/2011 | Shirado | B25J 9/1661 901/50 |
| 2015/0148953 | A1* | 5/2015 | Laurent | G05B 13/026 700/250 |
| 2015/0243324 | A1 | 8/2015 | Sandrew et al. | |
| 2015/0306761 | A1 | 10/2015 | O'Connor et al. | |
| 2016/0086050 | A1 | 3/2016 | Piekniewski et al. | |
| 2016/0096272 | A1* | 4/2016 | Smith | G05D 1/0088 700/255 |
| 2016/0184990 | A1* | 6/2016 | Song | G05D 1/0022 701/2 |
| 2017/0213070 | A1* | 7/2017 | Aghamohammadi | G06T 7/529 |
| 2017/0255832 | A1* | 9/2017 | Jones | G06V 40/20 |
| 2017/0281069 | A1* | 10/2017 | Gore | A61B 5/7475 |

FOREIGN PATENT DOCUMENTS

| | | |
|---|---|---|
| CN | 101809598 | 8/2010 |
| CN | 104758096 | 7/2015 |
| JP | H06106490 | 4/1994 |
| JP | H06314103 | 11/1994 |
| JP | H0780790 | 3/1995 |
| JP | H08212329 | 8/1996 |
| JP | 2015089598 | 5/2015 |
| JP | 2002059384 | 2/2022 |
| WO | 2008047872 | 4/2008 |

OTHER PUBLICATIONS

Hoffmann H. Perception through visuomotor anticipation in a mobile robot. Neural Networks. Jan. 1, 2007;20(1):22-33. (Year: 2007).*

Jaderberg, Max, Karen Simonyan, and Andrew Zisserman. "Spatial transformer networks." Advances in neural information processing systems 28 (2015). (Year: 2015).*

China National Intellectual Property Administration; Notice of Grant issued for Application No. 201780031172.7, 7 pages, dated Feb. 7, 2022.

Hoffman, H.; "Perception Through Visumotor Anticipation in a Mobile Robot;" Neural Networks 20.1 (2007) 22-33; 2007.

Pinto et al.; Supersizing Self-supervision_ Learning to Grasp from 50K Tries and 700 Robot Hours; 2016 IEEE International Comference on Robotics and Automation (ICRA); pp. 3406-3413; dated May 16, 2016.

Korean Intellectual Property Office; Grant of Patent issued in Application No. 10-2019-7013816; 2 pages dated Jul. 20, 2020.

European Patent Office; Extended European Search Report for Application No. 20165495.1 dated Jun. 29, 2020.

The Korean Intellectual Property Office: Office Action issued in Application No. 10-2019-7013816 dated Jan. 30, 2020.

Japanese Patent Office; Office Action issued in Application No. 2018-559945 dated Jun. 20, 2019.

Japanese Patent Office; Decision of Rejection issued in Application No. 2018-559945; dated Dec. 9, 2019.

European Patent Office; Examination Report issue in Application No. 17727043.6; 4 pages; dated Jul. 2, 2019.

European Patent Office; Intention to Grant issue in Application No. 17727043.6; 61 pages; dated Dec. 10, 2019.

Donahue et al., "Long-term Recurrent Convolutional Networks for Visual Recognition and Description;" Computer Vision Foundation, pp. 2625-2634; Year: 2015.

Korean Intellectual Property Office; Grant of Patent issued in Application No. 10-2018-7035430 dated Feb. 15, 2019.

European Patent Office; Communication pursuant to Article 94(3) EPC entered in Application No. EP 17727043.6; 4 pages; dated Nov. 22, 2018.

European Patent Office; Written Opinion of the International Preliminary Examining Authority of International Application No. PCT/US2017/032865; dated Jul. 9, 2018.

Levine et al.; Learning Hand-eye Cordination for Robotic Grasping with Deep Learning and Large-scale Data Collection; International Journal of Robotics Research; XP055400236; 12 Pages; US; dated Apr. 2, 2016.

Abadi et al., "Tensorflow: Large-scale Machine Learning on Heterogeneous Systems;" Software from tensorflow.org; 19 pages; Nov. 9, 2015.

Battaglia, et al., Simulation as an Engine of Physical Scene Understanding, Proceedings of the National Academy of Sciences, 110(45), dated Nov. 5, 2013.

Bengio, et al., Scheduled Sampling for Sequence Prediction with Recurrent Neural Networks. In Advances in Neural Information Processing Systems, pp. 1171-1179, dated 2015.

Boots et al., Learning Predictive Models of a Depth Camera & Manipulator from Raw Execution Traces, In International Conference on Robotics and Automation (ICRA), dated 2014.

Brubaker et al. Estimating Contact Dynamics. In International Conference on Computer Vision (ICCV), dated 2009.

Brabandere et al. Dynamic Filter Networks. In Neural Information Processing Systems (NIPS). dated 2016.

Eslami et al., Attend, Infer, Repeat: Fast Scene Understanding with Generative Models. Neural Information Processing Systems (NIPS), dated 2016.

Geiger et al. Vision Meets Robotics: The KITTI Dataset. International Journal of Robotics Research (IJRR), dated 2013.

Huang et al. Action-Reaction: Forecasting the Dynamics of Human Interaction. In European Conference on Computer Vision (ECCV). Springer, dated 2014.

Ionescu et al. Human3.6m: Large Scale Datasets and Predictive Methods for 3d Human Sensing in Natural Environments. PAMI, 36(7), dated 2014.

(56) References Cited

OTHER PUBLICATIONS

Jaderberg et al., Spatial Transformer Networks. In Neural Information Processing Systems (NIPS), dated 2015.
Karpathy et al., Large-scale Video Classification with Convolutional Neural Networks. In Compuer Vision and Pattern Recognition (CVPR), dated 2014.
Kingma et al., "Adam: A method for Stochastic Optimization;" International Conference on Learning (ICLR); 15 pages; 2015.
Lange et al., Autonomous Reinforcement Learning on Raw Visual Input Data in a Real World Application. In International Joint Conference on Neural Networks (IJCNN), dated 2012.
Lerer et al., Learning Physical Intuition of Block Towers by Example. International Conference on Machine Learning (ICML), dated 2016.
Lotter et al., Deep Predictive Coding Networks for Video Prediction and Unsupervised Learning. arXiv preprint arXiv:1605.08104, dated 2016.
Mathieu et al., Deep Multi-Scale Video Prediction beyond Mean Square Error. International Conference on Learning Representations (ICLR), dated 2016.
Mottaghi et al., Newtonian Image Understanding: Unfolding the Dynamics of Objects in Static Images. Computer Vision and Pattern Recognition (CVPR), dated 2015.
Mottaghi et al., "What Happens if . . . " Learning to Predict the Effect of Forces in Images. European Conference on Computer Vision (ECCV), dated 2016.
Oh et al., Action-conditional Video Prediction Using Deep Networksin Atari Games. In Neural Information Processing Systems (NIPS), dated 2015.
Ranzato et al., Video (language) Modeling: A Baseline for Generative Models of Natural Videos. arXiv preprint arXiv:1412.6604, dated 2014.
Srivastava et al., Unsupervised Learning of Video Representations Using Lstms. International Conference on Machine Learning (ICML), dated 2015.
Vondrick et al., Anticipating the Future by Watching Unlabeled Video. CoRR, abs/1504.08023, dated 2015.
Vondrick et al., Generating Videos with Scene Dynamics. In Neural Information Processing Systems (NIPS), dated 2016.
Walker et al., An Uncertain Future: Forecasting from Static Images Using Variational Autoencoders. In European Conference on Computer Vision (ECCV), dated 2016.
Walker et al., Patch to the future: Unsupervised Visual Prediction. In Computer Vision and Pattern Recognition (CVPR), dated 2014.
Watter et al., Embed to control: A Locally Linear Latent Dynamics Model for Control From Raw Images. In Neural Information Processing Systems (NIPS), dated 2015.
Xingjian et al., Convolutional LSTM network: A Machine Learning Approach for Precipitation Nowcasting. In Neural Information Processing Systems, dated 2015.
Xue et al., Visual Dynamics: Probabilistic Future Frame Synthesis via Cross Convolutional Networks. In Neural Information Processing Systems (NIPS), dated 2016.
Yuen et al., A Data-Driven Approach for Event Prediction. In European Conference on Computer Vision (ECCV), dated 2010.
International Searching Authority; International Search Report and Written Opinion of PCT Serial No. PCT/US2011732865; 15 Pages; dated Sep. 1, 2017.
China National Intellectual Property Administraction; First Office Action Issued in Application No. 201780031172.7; 12 pages; dated Mar. 31, 2021.
Japanese Patent Office; Notice of Allowance issued in Application No. 2020-069785; 3 pages; dated Jun. 14, 2021.
European Patent Office; Communication Pursuant to Article 94(3) EPC issued in Application No. 20165495.1; 6 pages; dated May 20, 2021.
China National Intellectual Property Administraction; Notice of Office Action issued in Application No. 201780031172.7; 5 pages; dated Nov. 2, 2021.
Japanese Patent Office; Office Action issued in Application No. 2021-116336; 11 pages; dated Oct. 31, 2022.
China National Intellectual Property Administraction; First Office Action Issued in Application No. 202210417177.6; 13 pages; dated Feb. 4, 2023.
European Patent Office; Communication pursuant to Article 94(3) EPC issued in Application No. 20165495.1; 7 pages; dated Mar. 20, 2023.
China National Intellectual Property Administration; Notification of Fulfilling of Registration Formality Issued for Application No. 202210417177.6, 5 pages, dated May 15, 2023.
Japan Patent Office; Notice of Reasons for Rejection issued for Application No. 2021-116336, 5 pages, dated May 29, 2023.
Japan Patent Office; Notice of Refusal issued for Application No. 2023-205781, 12 pages, dated Nov. 5, 2024.
European Patent Office; Intention to Grant issue in Application No. 20165495.1; 59 pages; dated Jun. 27, 2025.

* cited by examiner

MACHINE LEARNING METHODS AND APPARATUS RELATED TO PREDICTING MOTION(S) OF OBJECT(S) IN A ROBOT'S ENVIRONMENT BASED ON IMAGE(S) CAPTURING THE OBJECT(S) AND BASED ON PARAMETER(S) FOR FUTURE ROBOT MOVEMENT IN THE ENVIRONMENT

BACKGROUND

Many robots are programmed to utilize one or more end effectors to manipulate one or more objects. For example, a robot may utilize an end effector to apply force to an object and cause movement of that object. For instance, a robot may utilize a grasping end effector or other end effector to displace an object without necessarily grasping that object. Also, for instance, a robot may utilize a grasping end effector such as an "impactive" gripper or "ingressive" gripper (e.g., physically penetrating an object using pins, needles, etc.) to pick up an object from a first location, move the object to a second location, and drop off the object at the second location.

SUMMARY

Some implementations of this specification are directed generally to deep machine learning methods and apparatus related to predicting motion(s) (if any) that will occur to object(s) in an environment of a robot in response to particular movement of the robot in the environment. Some implementations are directed to training a deep neural network model to predict at least one transformation (if any), of an image of a robot's environment, that would occur as a result of implementing at least a portion of a particular movement of the robot in the environment. The trained deep neural network model may predict the transformation based on input that includes: (1) the image, and (2) robot movement parameters that define the portion of the particular movement. The predicted transformation may be utilized to transform the image to generate a predicted image of the robot's environment, where the predicted image predicts the robot's environment were the portion of the particular movement to occur. In other words, the predicted image illustrates a prediction of the robot's environment after the portion of the particular movement occurs and may be utilized, for example, to predict motion(s) of object(s) in the environment that would occur as a result of the particular movement.

The predicted motions(s) may be utilized for various purposes such as, for example, to determine whether to provide control commands to actuator(s) of the robot to effectuate the particular movement. For example, the predicted motion(s) can be compared to desired motion(s), and control commands implemented if the predicted motion(s) conform to the desired motion(s). In this manner, a result of a particular movement may be effectively "visualized" prior to implementation of the particular movement, and the particular movement implemented if the result is desirable. As described herein, in various implementations the deep neural network model predicts an image at each of a plurality of future time steps based on candidate movement parameters for those future time steps, thereby enabling effective visualization many time steps into the future.

In some implementations, a method is provided that includes generating candidate robot movement parameters that define at least a portion of a candidate movement performable in an environment of a robot by one or more components of the robot. The method further includes identifying a current image captured by a vision sensor associated with the robot. The current image captures at least a portion of the environment of the robot. The method further includes: applying the current image and the candidate robot movement parameters as input to a trained neural network; and generating at least one predicted transformation of the current image based on the application of the current image and the candidate robot movement parameters to the trained neural network. The method further includes transforming the current image based on the at least one predicted transformation to generate at least one predicted image. The predicted image predicts the portion of the environment of the robot if the at least the portion of candidate movement is performed in the environment by the components of the robot.

These, and other implementations, may optionally include one or more of the following features.

In some implementations, the method further includes: determining, based on the predicted image, to perform the candidate movement; and providing one or more control commands to one or more actuators of the robot to perform the candidate movement.

In some implementations, the method further includes: determining, based on the predicted image, to perform an alternate movement in lieu of the candidate movement; and providing one or more control commands to one or more actuators of the robot to perform the alternate movement.

In some implementations, the method further includes generating at least one compositing mask based on the application of the current image and the candidate robot movement parameters to the trained neural network. Transforming the current image is further based on the at least one compositing mask. As one example, the at least one predicted transformation can include a plurality of predicted transformations, the at least one compositing mask can include a plurality of compositing masks, and transforming the current image based on the at least one predicted transformation to generate the predicted image can include: generating a plurality of predicted images based on the plurality of predicted transformations; and compositing the predicted images based on the plurality of compositing masks to generate the predicted image.

In some implementations, the method further includes: generating second candidate robot movement parameters that define at least a portion of a second candidate movement performable in the environment by one or more of the components in lieu of the candidate movement. In those implementations, the method can further include: applying the current image and the second candidate robot movement parameters as input to the trained neural network; generating at least one second predicted transformation of the current image based on the application of the current image and the second candidate robot movement parameters to the trained neural network; and transforming one or more of the pixels of the current image based on the second predicted transformation to generate at least one second predicted image. The second predicted image predicts the portion of the environment of the robot if the at least the portion of the second candidate movement is performed in the environment by the components of the robot. In some versions of those implementations, the method further includes: selecting, based on the predicted image and the second predicted image, either the candidate movement or the second candidate movement; and providing one or more control commands to one or more actuators of the robot to perform the selected one of the candidate movement and the second candidate movement.

In some implementations, the method further includes: generating continuing candidate robot movement parameters that define another portion of the candidate movement that follows the portion of the candidate movement; applying the predicted image and the continuing candidate robot movement parameters to the trained neural network; generating at least one continuing predicted transformation of the predicted image based on the application of the predicted image and the continuing candidate robot movement parameters to the trained neural network; and transforming the predicted image based on the continuing predicted transformation to generate a continuing predicted image. In some of those implementations, the method further includes: determining, based on the predicted image and the continuing predicted image, to perform the candidate movement; and providing one or more control commands to one or more actuators of the robot to perform the candidate movement.

In some implementations, the trained neural network includes a plurality of stacked convolutional long short-term memory layers.

In some implementations, the at least on predicted transformation of pixels of the current image include parameters of one or more spatial transformers. In some of those implementations, transforming the current image includes: applying the one or more spatial transformers to the current image utilizing the parameters.

In some implementations, the at least one predicted transformation of pixels of the current image includes one or more normalized distributions each corresponding to one or more of the pixels. In some of those implementations, transforming the current image includes: applying the normalized distribution to the current image using a convolution operation. In some versions of those implementations, each of the normalized distributions corresponds to a corresponding one of the pixels.

In some implementations, applying the current image and the candidate robot motion parameters as input to the trained neural network includes: applying the current image as input to an initial layer of the trained neural network; and applying the candidate robot motion parameters to an additional layer of the trained neural network, the additional layer being downstream of the initial layer.

In some implementations, the candidate robot parameters include an initial robot state and an action that indicates a subsequent robot state. In some of those implementations, the initial robot state is a current pose of an end effector and the action is a commanded pose of the end effector.

In some implementations, a method is provided that includes identifying a current image captured by a vision sensor associated with a robot. The method further includes identifying a current state of the robot, and identifying a candidate action to transition the robot from the current state to a candidate state. The method further includes applying the current image, the current state, and the candidate action as input to a trained neural network. The method further includes generating at least one predicted image based on the application of the current image, the current state, and the candidate action to the trained neural network. The method further includes determining, based on the predicted image, to perform the candidate action. The method further includes, in response to determining to perform the candidate action, providing one or more control commands to one or more actuators of the robot to perform the candidate action.

In some implementations, a method is provided that includes identifying a plurality of training examples generated based on sensor output from sensors associated with one or more robots during a plurality of object motion attempts by the robots. Each of the training examples includes a group of sequential images from a corresponding attempt of the object motion attempts. Each of the images captures one or more corresponding objects in an environment at a corresponding instance of time, and for each of the sequential images: a state of the robot at the corresponding instance of time, and an action to be applied to transition the state of the robot at the corresponding instance of time to a new state corresponding to the next sequential image of the sequential images. The method further includes training the neural network based on the training examples.

Other implementations may include a non-transitory computer readable storage medium storing instructions executable by a processor (e.g., a central processing unit (CPU) or graphics processing unit (GPU)) to perform a method such as one or more of the methods described above and/or elsewhere herein. Yet another implementation may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
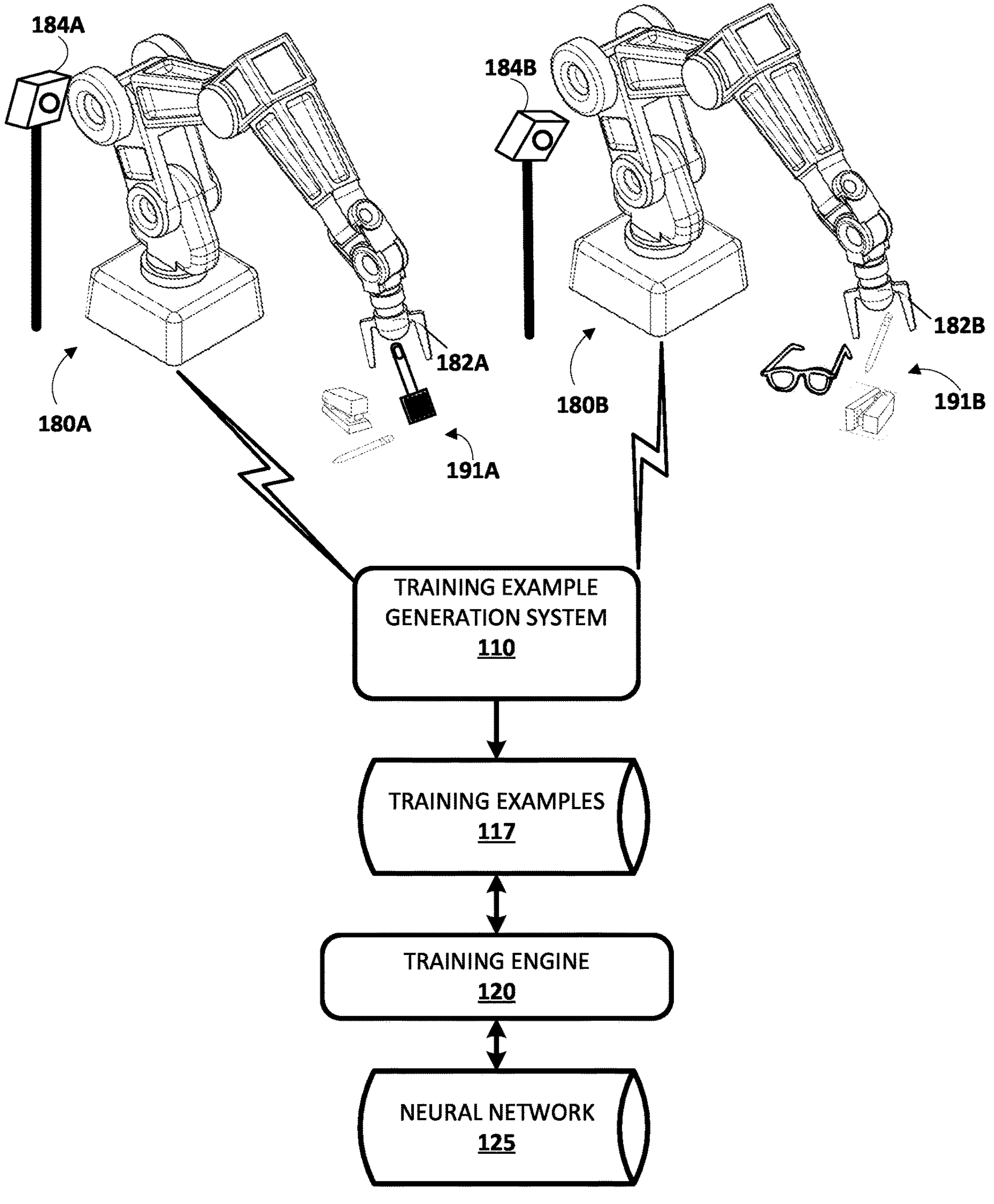
FIG. 1 illustrates an example environment in which object motion attempts may be performed by robots, data associated with the object motion attempts may be utilized to generate training examples, and/or the training examples may be utilized to train a neural network.

One challenge for a robot or other agent learning to interact with the world is to predict how its actions affect objects in its environment. Many methods for learning the dynamics of physical interactions require manually labeled object information. However, to scale real-world interaction learning to a variety of scenes and objects, acquiring manually labeled object information becomes increasingly impractical. To learn about physical object motion without necessitating labels of objects, implementations described herein employ an action-conditioned motion prediction model that explicitly models pixel motion, by predicting a distribution over pixel motion from previous frames. For example, implementations can advect pixels from a previous image frame and composite them onto a new image, rather than constructing the new image from scratch. Because the model explicitly predicts motion, it is at least partially invariant to object appearance, enabling it to generalize to previously unseen objects. To explore video prediction for real-world interactive agents, a dataset may be utilized of a large quantity (e.g., 50,000+) of robot interactions involving pushing motions. Utilizing such a dataset, a motion prediction model can be trained that enables accurate prediction of motion of object(s) in an image, conditioned on the robot's future actions. This enables utilization of the motion prediction model to "visually imagine" different futures based on different courses of action.

Object detection, tracking, and motion prediction are fundamental problems in computer vision, and predicting the effect of physical interactions is a challenge for agents acting in the world, such as robots, autonomous cars, and drones. Some existing techniques for learning to predict the effect of physical interactions rely on large manually labeled datasets. However, if unlabeled raw video data (consisting of sequential image frames) from interactive agents is used to learn about physical interaction, interactive agents can autonomously collect virtually unlimited experience through their own exploration. Learning a representation which can predict future video without labels has applications in action recognition and prediction and, when conditioned on the action of an agent, amounts to learning a predictive model that can then be used by the agent for planning and decision making.

However, learning to predict physical phenomena poses many challenges, since real-world physical interactions tend to be complex and stochastic, and learning from raw video requires handling the high dimensionality of image pixels and the partial observability of object motion from videos. Prior video prediction methods have typically considered short-range prediction, small image patches, or synthetic images. Such prior methods follow a paradigm of reconstructing future frames from the internal state of a model. In some implementations described herein, it is not required that the motion prediction model store the object and background appearance. Such appearance information can instead be obtained from the previous image frame (e.g., a previous image frame captured by a vision sensor of the robot, or a previous reconstructed image frame), enabling the motion prediction model to focus on motion prediction. Predictive models described herein may each merge appearance information from previous frame(s) with motion predicted by the model. As a result, the models may each be better able (relative to prior techniques) to predict future video sequences for multiple steps, even involving objects not seen at training time.

To merge appearance and predicted motion, the motion of pixels relative to the previous image can be generated as output over predictive models described herein. Applying this motion to the previous image frame forms the next image frame. Various motion prediction models can be utilized, three of which are described in detail herein. The first, which is sometimes referred to herein as a dynamic neural advection (DNA) model, outputs a distribution over locations in the previous image frame for each pixel in the new frame. The predicted pixel value is then computed as an expectation under this distribution. A variant on the DNA model, which is sometimes referred to herein as a convolutional dynamic neural advection (CDNA) model, outputs the parameters of multiple normalized convolution kernels to apply to the previous image frame to compute new pixel values. The last approach, which is sometimes referred to herein as a spatial transformer predictors (STP) model, outputs the parameters of multiple affine transformations to apply to the previous image frame. In the case of the DNA and STP models, each predicted transformation is meant to handle separate objects. To combine the predictions into a single image, the model also predicts a compositing mask over each of the transformations. DNA and CDNA may be simpler and/or easier to implement than STP, and the object-centric CDNA and STP models may also provide interpretable internal representations.

Various implementations described herein present techniques for making long-range predictions in real-world images by predicting pixel motion. When conditioned on the actions taken by an agent (e.g., a robot), the model can learn to imagine different futures from different actions (prior to those different actions being implemented). To learn about physical interaction from videos, a large dataset with complex object interactions may be utilized. As one example, a dataset of 50,000 robot pushing motions, consisting of 1.4 million image frames with the corresponding action at each time step may be utilized.

In order to learn about object motion while remaining invariant to appearance, a class of motion prediction models may be utilized that directly use appearance information from previous frame(s) to construct pixel motion predictions. The model computes the next frame by first predicting the motions of objects in pixel space, then merges these predictions via masking. Some of the potential motion prediction models are described below, including how to effectively merge predicted motion of multiple objects into a single next image prediction. The motion prediction models described herein that predict motion(s) of object(s) without attempting to reconstruct the appearance of the object(s) may be partially invariant to appearance and may generalize effectively to previously unseen objects. Three examples of motion prediction models are now briefly described in turn.

Dynamic Neural Advection (DNA) Motion Prediction Model

In the DNA motion prediction model, a distribution over locations is predicted in a previous frame for each pixel in a new frame. The predicted pixel value is computed as an expectation under this distribution. The pixel movement is constrained to a local region, under the regularizing assumption that pixels will not move large distances. This may keep the dimensionality of the prediction low.

Formally, the predicted motion transformation $\hat{M}$ is applied, to the previous image prediction $\hat{I}_{t-1}$ for every pixel (x, y) to form the next image prediction $\hat{I}_t$ as follows:

$$\hat{I}_t(x, y) = \sum_{k \in (-k,k)} \sum_{l \in (-k,k)} \hat{M}_{xy}(k, l) \hat{I}_{t-1}(x - k, y - l)$$

where K is the spatial extent of the predicted distribution. This can be implemented as a convolution with untied weights. The architecture of this model can match the example CDNA model in FIGS. 6A and 6B, except that the higher-dimensional transformation parameters $\hat{M}$, are outputted by the last convolutional layer (convolutional layer 662 of FIG. 6B) instead of being outputted by the fifth long short-term memory layer (LSTM layer 675 of FIG. 6B) as in the CDNA model of FIGS. 6A and 6B.

Convolutional Dynamic Neural Advection (CDNA) Motion Prediction Model

Under the assumption that the same mechanisms can be used to predict the motions of different objects in different regions of the image, the CDNA motion prediction model may present a more object-centric approach to predicting motion. Instead of predicting a different distribution for each pixel, this model predicts multiple discrete distributions that are each applied to the entire image via a convolution (with tied weights), which computes the expected value of the motion distribution for every pixel. Pixels on the same rigid object will move together, and therefore can share the same transformation. More formally, one predicted object transformation applied to the previous image $\hat{I}_{t-1}$ produces image ft for each pixel (x, y) as follows:

$$\hat{J}_t(x, y) = \sum_{k\in(-k,k)} \sum_{l\in(-k,k)} \hat{m}(k, l)\hat{I}_{t-1}(x-k, y-l)$$

where K is the spatial size of the normalized predicted convolution kernel m. Multiple transformations $\{\hat{m}^{(l)}\}$ are applied to the previous image $\hat{I}_{t-1}$ to form multiple images $$\{\hat{J}_t^{(i)}\}.$$

Figure 6A:
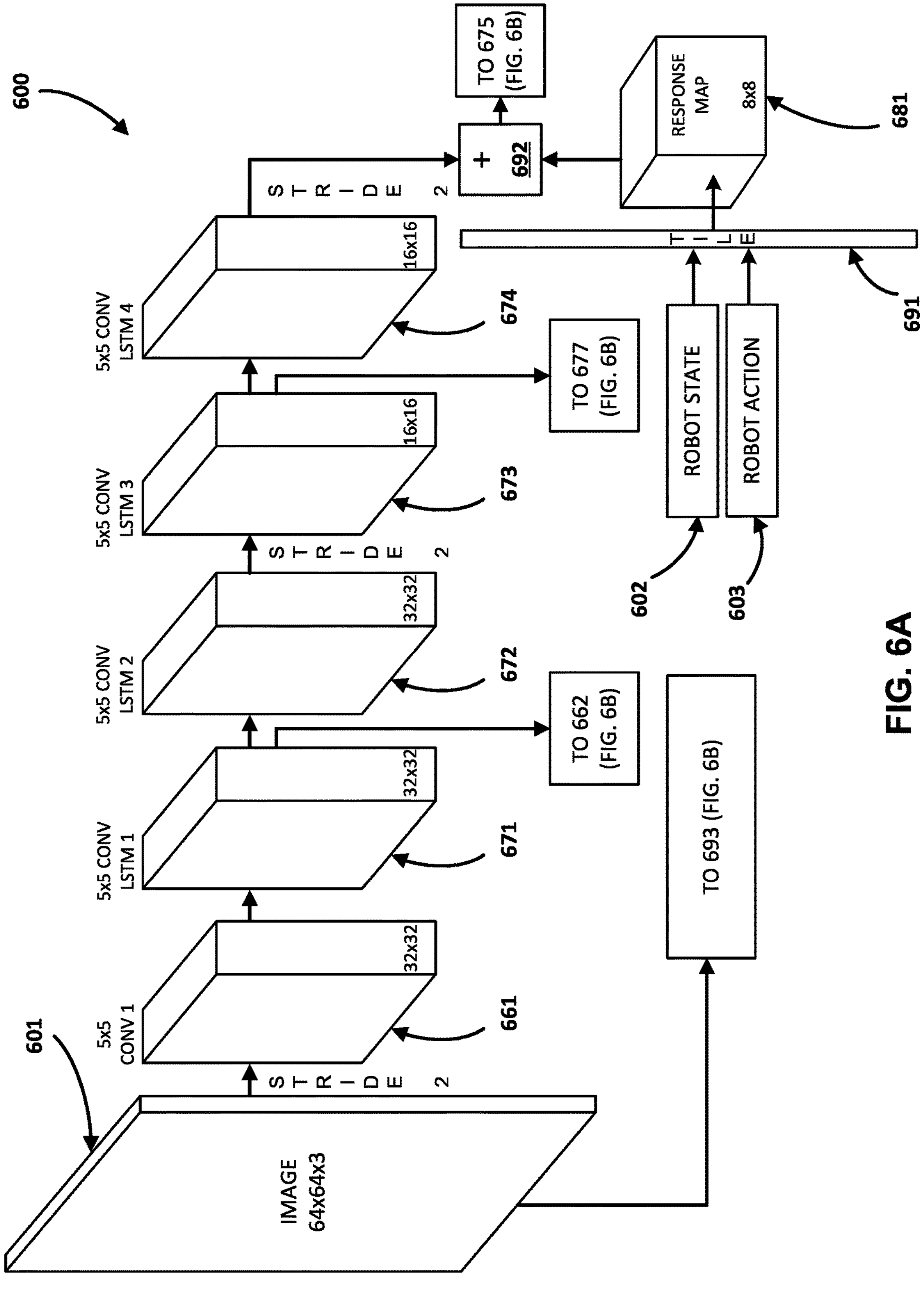
FIG. 6A and FIG. 6B illustrate an architecture of an example neural network, illustrates example inputs that may be provided to the neural network, illustrates example outputs of the neural network, and illustrates how the example outputs may be utilized to generate a predicted image.
Figure 6B:
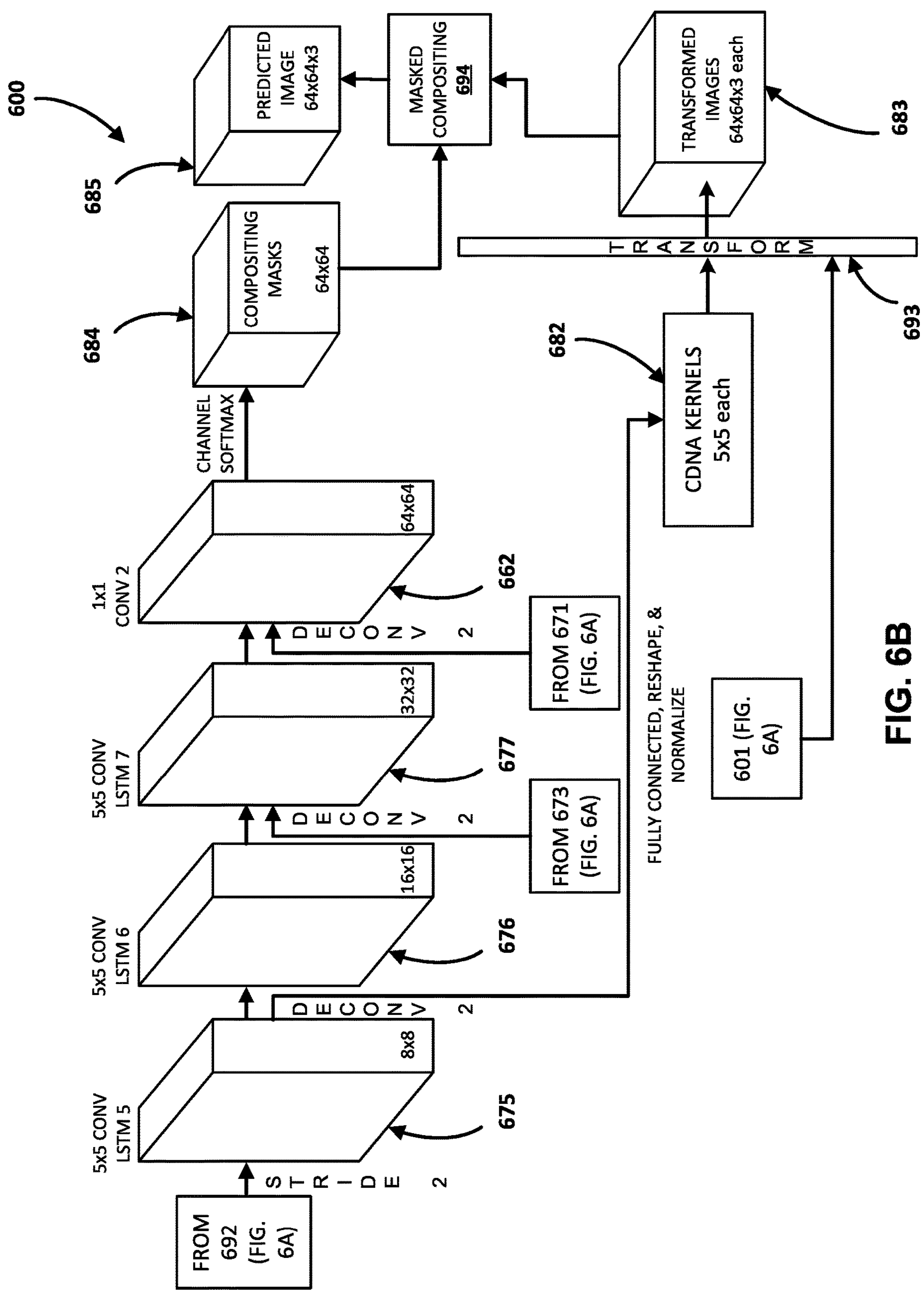

These output images are combined into a single prediction $\hat{I}_t$ as described below and as illustrated in FIGS. 6A and 6B.

Spatial Transformer Predictors (STP) Motion Prediction Model

The STP motion prediction model produces multiple sets of parameters for 2D affine image transformations, and applies the transformations using a bilinear sampling kernel. More formally, a set of affine parameters $\hat{M}$ produces a warping grid between pixels $(x_{t-1}, y_{t-1})$ in the previous image and pixels $(x_T, y_t)$ in the generated image.

$$\begin{pmatrix} x_{t-1} \\ Y_{t-1} \end{pmatrix} = \hat{M}\begin{pmatrix} x_t \\ Y_t \\ 1 \end{pmatrix}$$

This grid can be applied with a bilinear kernel to form an image $j_t$ $$\hat{J}_t(x_t, y_t) = \sum_k^W \sum_l^H \hat{I}_{t-1}(k, l)\max(0, 1-|x_{t-1}-k|)\max(0, 1-|y_{t-1}-l|)$$

where W and H are the image width and height. Multiple transformations $\{M^{(i)}\}$ are applied to the previous image $\hat{I}_{t-1}$ to form multiple images $$\{\hat{J}_t^{(i)}\},$$

which are then composited based on the masks. The architecture can match the CDNA architecture of FIGS. 6A and 6B, but instead of outputting CDNA kernels at the fifth LSTM layer (LSTM layer 775 of FIG. 6B), the model outputs the transformation parameters at the fifth LSTM layer (LSTM layer 775 of FIG. 6B).

The DNA, CDNA, and STP motion prediction models can each be constructed and trained to focus on learning physics rather than object appearance. As a result, such models may be better able to generalize to unseen objects compared to models that reconstruct the pixels directly or predict the difference from the previous frame.

CDNA and STP motion prediction models produce multiple object motion predictions that can be used to generate multiple transformed images (a transformed image for each object motion prediction). The multiple transformed images need to be combined into a single image. To do so, the CDNA and STP models may also predict a set of masks to apply to the transformed images. These masks indicate how much each transformed image influences each pixel. A softmax over the channels of the mask may ensure that it sums to one. More formally, the composition of the predicted image $$\hat{I}_t = \sum_c \hat{J}_t^{(c)} \circ \Theta_c,$$

can be modulated by a mask Ξ, which defines a weight on each prediction, for each pixel. Thus, $$\hat{J}_t^{(i)}$$

where c denotes the channel of the mask and the element-wise multiplication is over pixels. In practice, the model may learn to mask out objects that are moving in consistent directions. Benefits of this approach may include, for example: predicted motion transformations are reused for multiple pixels in the image; and/or the model naturally extracts a more object centric representation in an unsupervised fashion, a potentially desirable property for an agent learning to interact with objects.

For each motion prediction model, including DNA, a "background mask" may be included where the models are allowed to copy pixels directly from the previous image (e.g., a captured image frame in an initial iteration, or immediately preceding predicted image in subsequent iterations). Additionally, to fill in previously occluded regions, which may not be well represented by nearby pixels, the models are allowed to generate pixels from an image, and include it in the final masking step. Besides improving performance, this also produces interpretable background masks.

To generate the motion predictions discussed above, stacked convolutional LSTMs may be employed in the motion prediction models. Recurrence through convolutions works for multi-step video prediction because it takes advantage of the spatial invariance of image representations, as the laws of physics are mostly consistent across space. As a result, models with convolutional recurrence may require significantly fewer parameters and/or use those parameters more efficiently.

In an interactive setting, the agent's candidate actions and internal state (such as the pose of the robot gripper) also influence the next image, and both can be integrated into the model by tiling a vector of the concatenated internal state and candidate action(s) across the spatial extent of the lowest-dimensional activation map. Note, though, that the agent's internal state (e.g., the current robot gripper pose) is only input into the network at the initial time step, and in some implementations must be predicted from the actions in future time steps. For example, the robot gripper pose can be predicted at a future time step based on modification of the current robot gripper pose in view of the candidate action(s). In other words, the robot gripper pose at a future time step can be determined based on assuming that candidate action(s) of prior time step(s) have been implemented. The neural network may be trained using an $I_2$ reconstruction loss. Alternative losses could complement this method.

One application of action-conditioned video prediction is to use the learned model for decision making in vision-based robotic control tasks. Unsupervised learning from video can enable agents to learn about the world on their own, without human involvement, which can be beneficial for scaling up interactive learning. To investigate action-conditioned video prediction for robotic tasks, a dataset with real-world physical object interactions can be used. For example, a dataset can be generated using 10 robotic arms pushing hundreds of objects in bins, amounting to 50,000 interaction sequences with over 1 million video frames. In addition including an image (e.g., RGB image or RGBD image), each frame can also be annotated with: the gripper pose at the time step of the frame, which may be referred to herein as the "internal state" or "robot state"; and the action at the time step, which may correspond to gripper pose at a subsequent (e.g., next) time step, or a motion vector or command to reach the gripper pose at the subsequent time step.

In some implementations, at run time, initial image(s) may be provided as input to a trained neural network model, as well as the initial robot state and candidate action(s). The initial robot state can be, for example, a current gripper pose and the candidate action(s) can be candidate actions that each cause the current gripper pose to move to a corresponding new gripper pose. The model can then be sequentially rolled out, with each subsequent time step passing in the predicted image from the prior time step, a candidate action for that time step, and an updated robot state. As described above, the updated robot state of a given iteration can be a state that assumes the candidate action(s) of the prior time step(s) have been applied (i.e., the initial robot state as modified by the candidate action(s) of prior time step(s)). In some implementations, the neural network may be trained for 8 future time steps for all recurrent models, and used for up to 18 future time steps. Other quantities of future time steps can be used for training and/or use.

Some implementations of techniques described herein may additionally or alternatively be utilized to generate a model for predicting future video without consideration of robot states and/or actions. For example, a dataset that consists of videos of human actors performing various actions in a room can be used to train the model. The videos may optionally be subsampled down (e.g., to 10 frames per second) such that there is noticeable motion in the videos within reasonable timeframes. Since the model is no longer conditioned on actions, X (e.g., 10) video frames can be fed in and the network trained to produce the next X (e.g., 10 frames).

Predicting future object motion in the context of a physical interaction may be utilized in an intelligent interactive system. The kind of action-conditioned prediction of future video frames described herein can allow an interactive agent, such as a robot, to imagine different futures based on the available candidate actions. Such a mechanism can be used to plan for actions to accomplish a particular goal, anticipate possible future problems (e.g., in the context of an autonomous vehicle, obstacle avoidance), and recognize interesting new phenomena in the context of exploration. As one particular example, a goal state for an object can be defined. For example, a human can utilize user interface input to define a goal state for an object. For instance, the human can manipulate the object through an interface that displays an image captured by the robot, where the image includes the object and the manipulation enables adjustment of the pose of the object. Also, for example, internal systems of a robot can define a goal state for an object in accomplishing a task directed toward the object (e.g., moving the object to a new pose). Various candidate actions can then be considered utilizing the motion prediction model to generate multiple predicted images. The predicted image can be determined that depicts the object most closely to its goal state, and the applied candidate actions to generate the predicted image can be selected and applied by the robot to move the object to its goal state. In this manner, the motion prediction model can be utilized to predict the effects of various candidate actions on the environment of the robot, and the candidate actions selected that resulted in predicted image(s) that most closely conform to a desired environmental effect. This enables initial consideration of the effects of various robot actions, without actually implementing those actions, followed by a selection of one or more of those robot actions to actually implement based on the considered effects.

Some implementations of the technology described herein are directed to training a neural network, such as a neural network including stacked long short-term memory (LSTM) layers, to enable utilization of the trained neural network to predict a transformation that will occur to an image of a robot's environment in response to particular movement of the robot in the environment. In some implementations, the trained neural network accepts an image ($I_t$) generated by a vision sensor and accepts candidate robot movement parameters ($p_t$), such as parameters that define a current robot state and/or one or more candidate actions to be performed to cause the current robot state to transition to a different robot state. In some implementations, the current robot state may be the pose of an end effector of the robot (e.g., a pose of a gripping end effector) and each candidate action may each be (or indicate) a subsequent pose of the end effector. Accordingly, in some of those implementations, the candidate actions may each indicate a motion vector to move from a pose of the end effector to a subsequent pose of the end effector. For example, a first candidate action may indicate a motion vector to move from the current pose to a pose at a next time step, a second candidate action may indicate a motion vector to move from that pose to a pose at the next time step, and so forth. The application of the image ($I_t$) and the candidate robot movement parameters ($p_t$) to the trained neural network may be used to generate, over the neural network, at least one predicted transformation that will occur to the image ($I_t$) in response to implementation of the candidate robot movement parameters ($p_t$). In some of those implementations, the predicted transformation is utilized to transform the image ($I_t$) to a predicted image ($PI_t$). The predicted image ($PI_t$), and/or one or more additional predicted images generated based on additional predicted transformations of the neural network, may be utilized to determine whether to implement the candidate robot movement parameters. For instance, the predicted image(s) can be analyzed to determine predicted motion(s) of object(s) in the environment that will occur based on the candidate robot movement parameters, and the candidate robot movement parameters implemented if the predicted motion(s) are desirable. Additional description of these and other implementations of the technology is provided below.

With reference to FIGS. 1-7, various implementations of training and utilizing a motion prediction neural network are described. FIG. 1 illustrates an example environment in which object motion attempts may be performed by robots (e.g., robots 180A, 180B, and/or other robots), data associated with the object motion attempts may be utilized to generate training examples, and/or the training examples may be utilized to train a motion prediction neural network.

Figure 2:
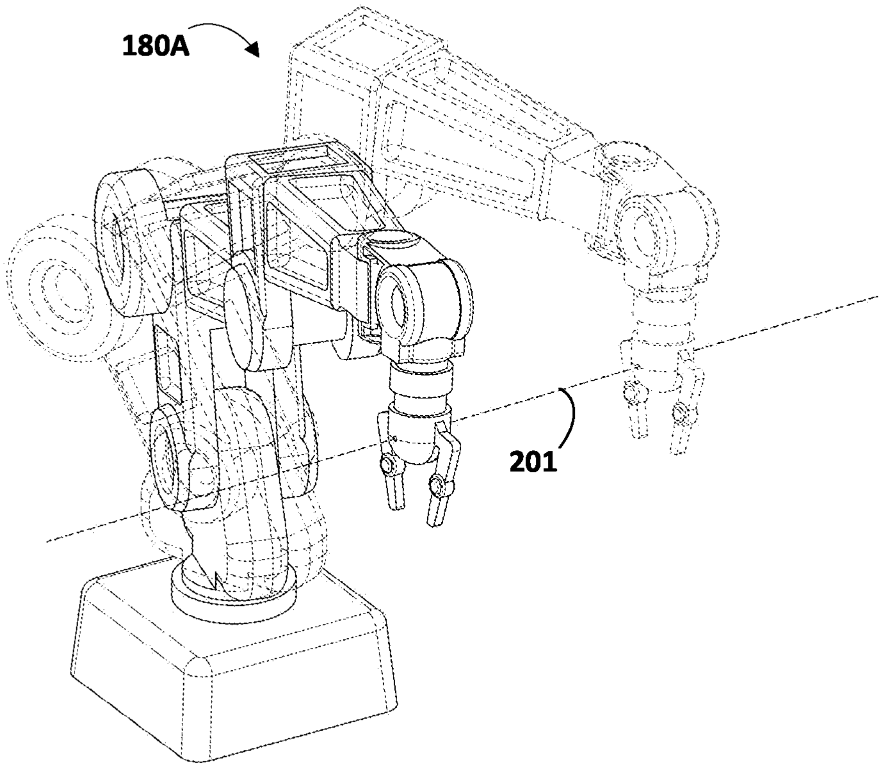
FIG. 2 illustrates one of the robots of FIG. 1 and an example of movement of a grasping end effector of the robot along a path.

Example robots 180A and 180B are illustrated in FIG. 1. Robots 180A and 180B are "robot arms" having multiple degrees of freedom to enable, through movement of the robot, a traversal of grasping end effectors 182A and 182B along any of a plurality of potential paths to position the grasping end effectors 182A and 182B in desired poses. For example, with reference to FIG. 2, an example of robot 180A traversing its end effector along a path 201 is illustrated. FIG. 2 includes a phantom and non-phantom image of the robot 180A showing two different poses of a set of poses struck by the robot 180A and its end effector in traversing along the path 201. Referring again to FIG. 1, robots 180A and 180B each further controls the two opposed "claws" of their corresponding grasping end effector 182A, 182B to actuate the claws between at least an open position and a closed position (and/or optionally a plurality of "partially closed" positions).

Example vision sensors 184A and 184B are also illustrated in FIG. 1. In FIG. 1, vision sensor 184A is mounted at a fixed pose relative to the base or other stationary reference point of robot 180A. Vision sensor 184B is also mounted at a fixed pose relative to the base or other stationary reference point of robot 180B. As illustrated in FIG. 1, the pose of the vision senor 184A relative to the robot 180A is different than the pose of the vision sensor 184B relative to the robot 180B. In some implementations such differing poses may be beneficial to enable generation of varied training examples that can be utilized to train a neural network that is robust to and/or independent of camera calibration. Vision sensors 184A and 184B are sensors that can generate images related to shape, color, depth, and/or other features of object(s) that are in the line of sight of the sensors. The vision sensors 184A and 184B may be, for example, monographic cameras, stereographic cameras, and/or 3D laser scanner. A 3D laser scanner includes one or more lasers that emit light and one or more sensors that collect data related to reflections of the emitted light. A 3D laser scanner may be, for example, a time-of-flight 3D laser scanner or a triangulation based 3D laser scanner and may include a position sensitive detector (PSD) or other optical position sensor.

The vision sensor 184A has a field of view of at least a portion of the workspace of the robot 180A, such as the portion of the workspace that includes example objects 191A. Although resting surface(s) for objects 191A are not illustrated in FIG. 1, those objects may rest on a table, a bin, and/or other surface(s). Objects 191A include a spatula, a stapler, and a pencil. In other implementations more objects, fewer objects, additional objects, and/or alternative objects may be provided during all or portions of object motion attempts of robot 180A as described herein. The vision sensor 184B has a field of view of at least a portion of the workspace of the robot 180B, such as the portion of the workspace that includes example objects 191B. Although resting surface(s) for objects 191B are not illustrated in FIG. 1, they may rest on a table, a bin, and/or other surface(s). Objects 191B include a pencil, a stapler, and glasses. In other implementations more objects, fewer objects, additional objects, and/or alternative objects may be provided during all or portions of object motion attempts of robot 180B as described herein.

Although particular robots 180A and 180B are illustrated in FIG. 1, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized. For example, end effectors that are incapable of grasping may be utilized. Additionally, although particular mountings of vision sensors 184A and 184B are illustrated in FIG. 1, additional and/or alternative mountings may be utilized. For example, in some implementations, vision sensors may be mounted directly to robots, such as on non-actuable components of the robots or on actuable components of the robots (e.g., on the end effector or on a component close to the end effector). Also, for example, in some implementations, a vision sensor may be mounted on a non-stationary structure that is separate from its associated robot and/or may be mounted in a non-stationary manner on a structure that is separate from its associated robot.

Robots 180A, 180B, and/or other robots may be utilized to perform a large quantity of object motion attempts and data associated with the object motion attempts may be utilized by the training example generation system 110 to generate training examples. In some implementations, object motion attempts include random and/or pseudo-random movement of the end effectors of the robots in an attempt to move one or more objects in an environment of the robot. For example, an attempt by robot 180A to move one or more of the objects 191A.

In some implementations, all or aspects of training example generation system 110 may be implemented on robot 180A and/or robot 180B (e.g., via one or more processors of robots 180A and 180B). For example, robots 180A and 180B may each include an instance of the training example generation system 110. In some implementations, all or aspects of training example generation system 110 may be implemented on one or more computer systems that are separate from, but in network communication with, robots 180A and 180B.

Each object motion attempt by robot 180A, 180B, and/or other robots consists of *T separate* time steps or instances. At each time step, a current image ($I_T$) captured by the vision sensor of the robot performing the object motion attempt is stored, current robot parameters ($p_T$) are also stored, and the robot chooses a movement for the next time step. In some implementations, the current robot parameters for a time step may include, for example, the robot's current state (e.g., current end effector pose at the time step), and an action (e.g., the action to be implemented to implement the movement of the next time step). In some implementations, the action for a time step can be determined based on the robot's state at a subsequent time step, as compared to the robot's current state. For example, the action can be a motion vector to move from the robot's current state to the robot's final state at the end of the object motion attempt (e.g., a vector from the current state to the final state). In some implementations, robots may be commanded via impedance control of their end effectors during one or more object motion attempts. In some implementations, one or more (e.g., all) object motion attempts may last from approximately 3-5 seconds. In some implementations, the robot 180A, 180B, and/or other robots may be programmed to move out of the field of view of the vision sensor in between object motion attempts, and an image may be captured by the vision sensor when the robot is out of view and that image associated with the immediately following object motion attempt.

In some implementations, object motion attempts may include random push attempts and/or "sweep to the middle" attempts. Random push attempts may be random (e.g., truly random and/or pseudo-random) movements of the end effector, optionally within a constrained area, such as an area near the objects 191A/191B, an area that is based on a bin that contains the objects 191A/191B, etc. Sweep to the middle attempts may start from a random position near or on the outside border of a constrained area within which the object motion attempts are restricted, and may meander the end effector toward the middle of the constrained area. For example, the constrained area may generally conform to a bin, and the random sweep attempts may start from a random position near the periphery of the bin and meandered randomly toward the middle of the bin. The random sweep attempts may be beneficial to prevent objects from piling up on the edges of the bin.

Each object motion attempt results in at least one training example with T frames, represented by ($I_T$, $p_T$). That is, each frame of a training example includes at least the image observed at the corresponding time step ($I_t$), robot movement parameters ($p_T$) that indicate the robot state at the corresponding time step and the action to be implemented at the corresponding time step. The training examples for the plurality of object motion attempts of a plurality of robots are stored by the training example generation system 110 in training examples database 117.

The data generated by sensor(s) associated with a robot and/or the data derived from the generated data may be stored in one or more non-transitory computer readable media local to the robot and/or remote from the robot. In some implementations, images captured by vision sensors may include multiple channels, such as a red channel, a blue channel, a green channel, and/or a depth channel. Each channel of an image defines a value for each of a plurality of pixels of the image such as a value from 0 to 255 for each of the pixels of the image. In some implementations, the image observed at an initial time step ($I_T$) for each of the training examples may be concatenated with an additional image in the training examples. The additional image may be an additional image that preceded the corresponding object motion attempt, where the additional image does not include the grasping end effector and/or other components of the robot—or includes the end effector and/or other robot components in a different pose (e.g., one that does not overlap with the pose of the current image). For instance, the additional image may be captured after any preceding object motion attempt, but before end effector movement for the object motion attempt begins and when the grasping end effector is moved out of the field of view of the vision sensor.

The training engine 120 trains a neural network 125 based on the training examples of training examples database 117. In some implementations, training the CNN 125 includes iteratively updating the neural network 125 based on application of the training examples to the neural network 125. The trained CNN 125 is trained to predict transformation(s) that will occur to an image of a robot's environment in response to particular movement(s) of the robot in the environment.

Figure 3:
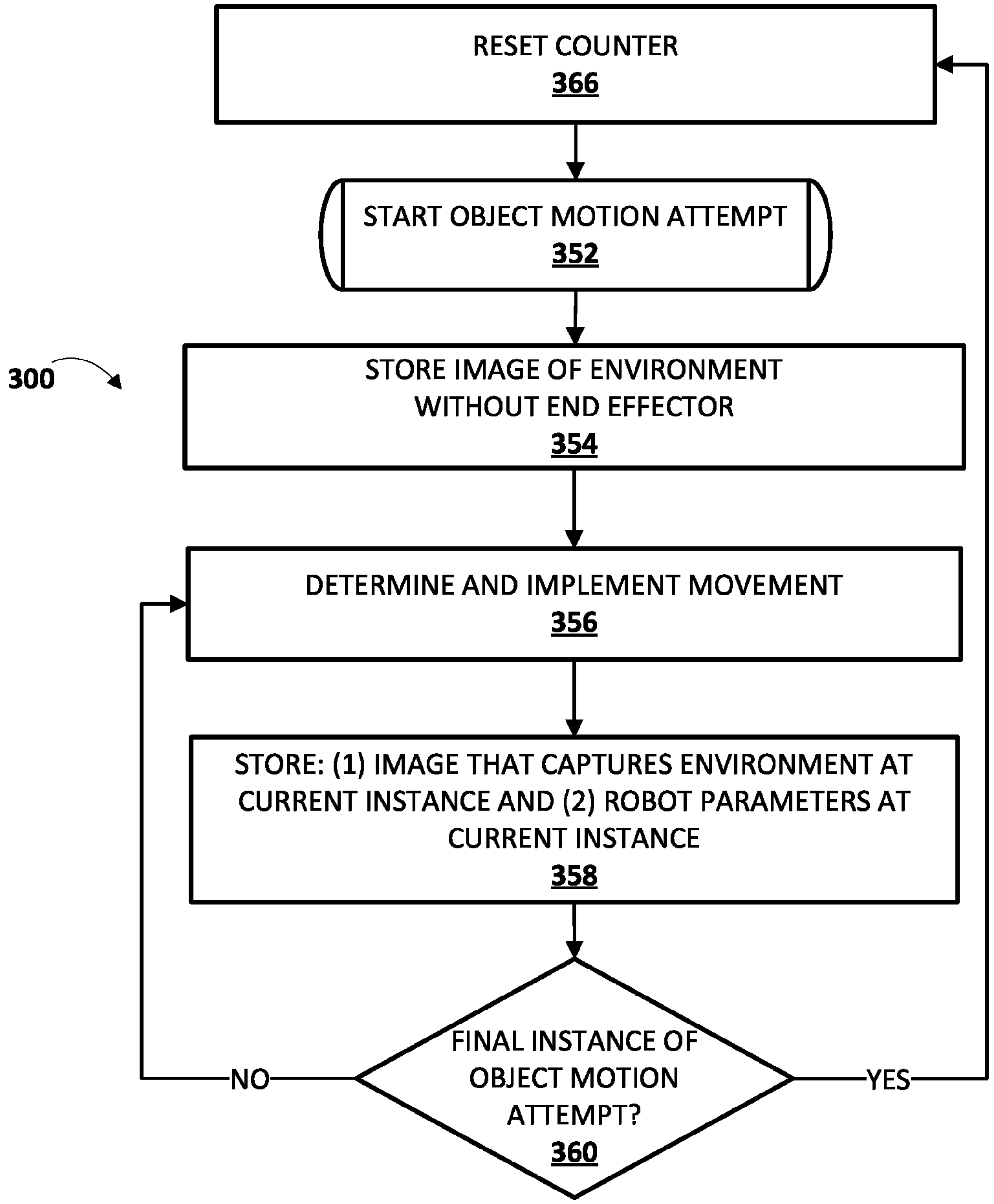
FIG. 3 is a flowchart illustrating an example method of performing object motion attempts and storing data associated with the object motion attempts.

FIG. 3 is a flowchart illustrating an example method 300 of performing object motion attempts and storing data associated with the object motion attempts. For convenience, the operations of the flow chart are described with reference to a system that performs the operations. This system may include one or more components of a robot, such as a processor and/or robot control system of robot 180A, 180B, 840, and/or other robot. Moreover, while operations of method 300 are shown in a particular order, this is not meant to be limiting. One or more operations may be reordered, omitted or added.

At block 352, the system starts an object motion attempt. At block 354, the system stores an image of an environment without an end effector present in the image. For example, the system may move the grasping end effector out of the field of view of the vision sensor (i.e., not occluding the view of the environment) and capture an image at an instance when the grasping end effector is out of the field of view. The image may then be stored and associated with the object motion attempt. In some implementations, block 354 may be omitted.

At block 356, the system determines and implements a movement. For example, the system may generate one or more motion commands to cause one or more of the actuators that control the pose of an end effector to actuate, thereby changing the pose of the end effector.

In some implementations and/or iterations of block 356, the motion command(s) may be random within a given space, such as the work-space reachable by the end effector, a constrained space within which the end effector is confined for the object motion attempts, and/or a space defined by position and/or torque limits of actuator(s) that control the pose of the end effector. For example, the motion command(s) generated by the system at block 356 to implement movement may be random within a given space. Random, as used herein, may include truly random or pseudo-random.

In some implementations, in the first iteration of block 356 for each object motion attempt, the end effector may be "out of position" based on it being moved out of the field of view at block 354. In some of those implementations, prior to the first iteration of block 356 the end effector may be randomly or otherwise moved "back into position". For example, the end effector may be moved back to a set "starting position" and/or moved to a randomly selected position within a given space.

At block 358, the system stores: (1) an image that captures the environment of the robot at the current instance (time step) of the object motion attempt and (2) the robot parameters at the current instance. For example, the system may store a current image generated by a vision sensor associated with the robot and associate the image with the current instance (e.g., with a timestamp). Also, for example the system may determine the robot parameters based on data from one or more joint position sensors of joints of the robot and/or torque sensors of the robot, and the system may store those parameters. The system may determine and store the robot parameters in task-space, joint-space, and/or another space.

At block 360, the system determines whether the current instance is the final instance for the object motion attempt. In some implementations, the system may increment an instance counter at block 352, 354, 356, or 358 and/or increment a temporal counter as time passes—and determine if the current instance is the final instance based on comparing a value of the counter to a threshold. For example, the counter may be a temporal counter and the threshold may be 3 seconds, 4 seconds, 5 seconds, and/or other value. In some implementations, the threshold may vary between one or more iterations of the method 300.

If the system determines at block 360 that the current instance is not the final instance for the object motion attempt, the system returns to blocks 356, where it determines and implements an additional movement, then proceeds to block 358 where it stores an image and the robot parameters at the current instance (of the additional movement). In many implementations, blocks 356, 358, 360, and/or other blocks may be performed at a relatively high frequency, thereby storing a relatively large quantity of data for each object motion attempt.

If the system determines at block 360 that the current instance is the final instance for the object motion attempt, the system proceeds to block 366, where the system resets the counter (e.g., the instance counter and/or the temporal counter), and proceeds back to block 352 to start another object motion attempt.

In some implementations, the method 300 of FIG. 3 may be implemented on each of a plurality of robots, optionally operating in parallel during one or more (e.g., all) of their respective iterations of method 300. This may enable more object motion attempts to be achieved in a given time period than if only one robot was operating the method 300. Moreover, in implementations where one or more of the plurality of robots includes an associated vision sensor with a pose relative to the robot that is unique from the pose of one or more vision sensors associated with other of the robots, training examples generated based on object motion attempts from the plurality of robots may provide robustness to vision sensor pose in a neural network trained based on those training examples. Moreover, in implementations where end effectors and/or other hardware components of the plurality of robots vary and/or wear differently, and/or in which different robots interact with different objects (e.g., objects of different sizes, different weights, different shapes, different translucencies, different materials) and/or in different environments (e.g., different surfaces, different lighting, different environmental obstacles), training examples generated based on object motion attempts from the plurality of robots may provide robustness to various robotic and/or environmental configurations.

In some implementations, the objects that are reachable by a given robot and on which object motion attempts may be made may be different during different iterations of the method 300. For example, a human operator and/or another robot may add and/or remove objects to the workspace of a robot between one or more object motion attempts of the robot. This may increase the diversity of the training data. In some implementations, environmental factors such as lighting, surface(s), obstacles, etc. may additionally and/or alternatively be different during different iterations of the method 300, which may also increase the diversity of the training data.

Figure 4:
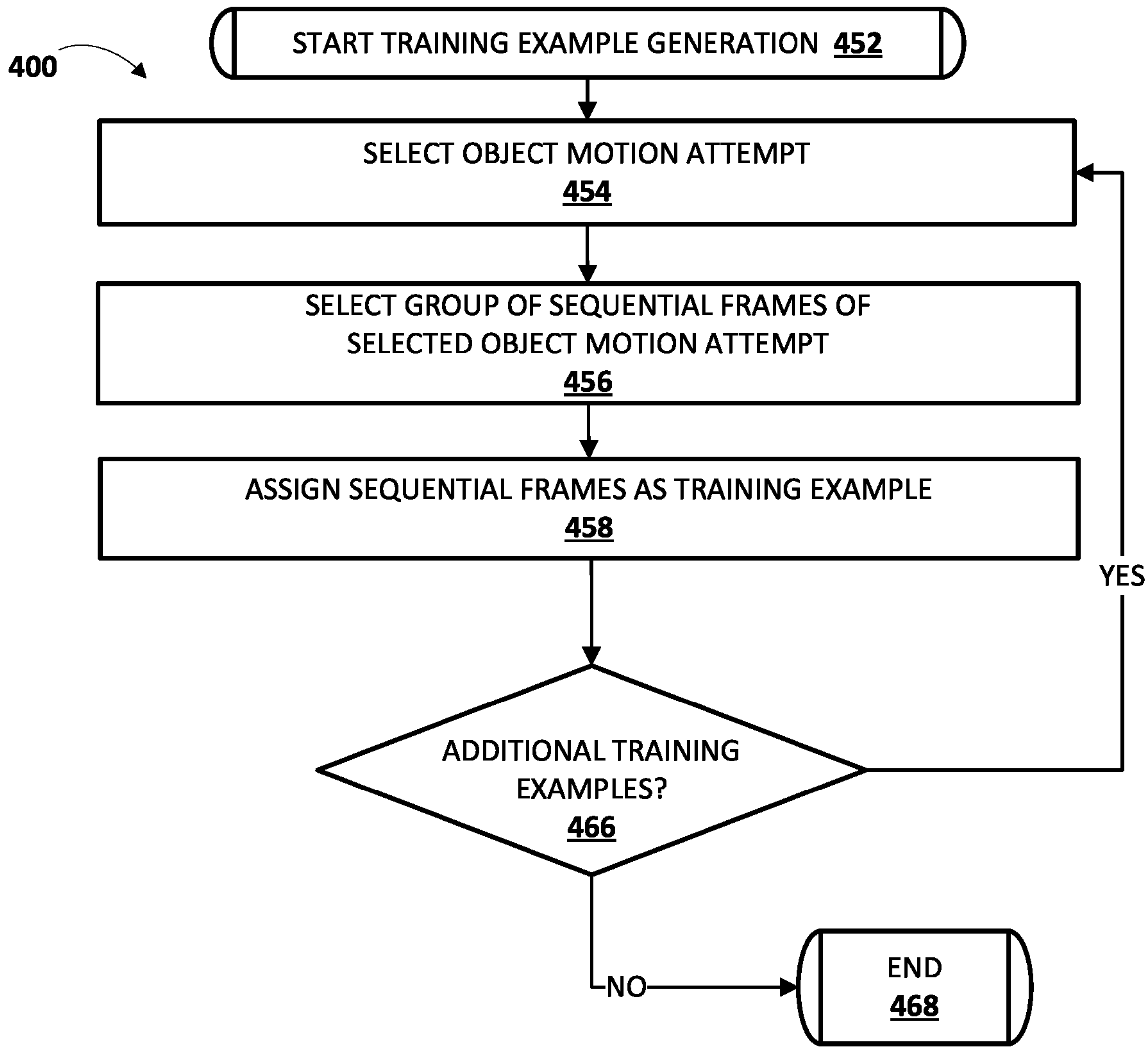
FIG. 4 is a flowchart illustrating an example method of generating training examples based on data associated with object motion attempts of robots.

FIG. 4 is a flowchart illustrating an example method 400 of generating training examples based on data associated with object motion attempts of robots. For convenience, the operations of the flow chart are described with reference to a system that performs the operations. This system may include one or more components of a robot and/or another computer system, such as a processor and/or robot control system of robot 180A, 180B, 840, and/or a processor of training example generation system 110 and/or other system that may optionally be implemented separate from a robot. Moreover, while operations of method 400 are shown in a particular order, this is not meant to be limiting. One or more operations may be reordered, omitted or added.

At block 452, the system starts training example generation. At block 454, the system selects an object motion attempt. For example, the system may access a database that includes data associated with a plurality of stored object motion attempts, and select one of the stored object motion attempts. The selected object motion attempt may be, for example, an object motion attempt generated based on the method 300 of FIG. 3.

At block 456, the system selects a group of sequential frames of the object motion attempt. For example, the system may select the initial frame of the object motion attempt as the first instance of the group, may select an immediately next in time frame as the second instance of the group, select the immediately next in time frame as the third instance of the group, etc. As another example, the system may select the fifth frame of the object motion attempt as the first instance of the group, select the sixth frame of the object as the second instance of the group, etc.

At block 458, the system assigns the sequential frames as a training example. As described, the sequential frames can each include an image at a corresponding time step, a robot state at the corresponding time step, and an action for the corresponding time step. In some implementations, at block 456 or block 458 the system may optionally process the image(s) of the frames. For example, the system may optionally resize the image to fit a defined size of an input layer of the neural network, remove one or more channels from the image, and/or normalize the values for depth channel(s) (in implementations where the images include a depth channel).

At block 460, the system determines whether additional training examples are to be generated. If so, the system proceeds back to block 454 and selects an object motion attempt (e.g., a different object motion attempt). If not, training example generation ends at block 468.

In some implementations, determining whether additional training examples are to be generated may include determining whether there are any remaining unprocessed object motion attempts. In some implementations, determining whether additional training examples are to be generated may additionally and/or alternatively include determining whether a threshold number of training examples has already been generated and/or other criteria has been satisfied.

Another iteration of method 400 may be performed again. For example, the method 400 may be performed again in response to at least a threshold number of additional object motion attempts being performed.

Although method 300 and method 400 are illustrated in separate figures herein for the sake of clarity, it is understood that one or more blocks of method 400 may be performed by the same component(s) that perform one or more blocks of the method 300. For example, one or more (e.g., all) of the blocks of method 300 and the method 400 may be performed by processor(s) of a robot. Also, it is understood that one or more blocks of method 400 may be performed in combination with, or preceding or following, one or more blocks of method 300.

Figure 5:
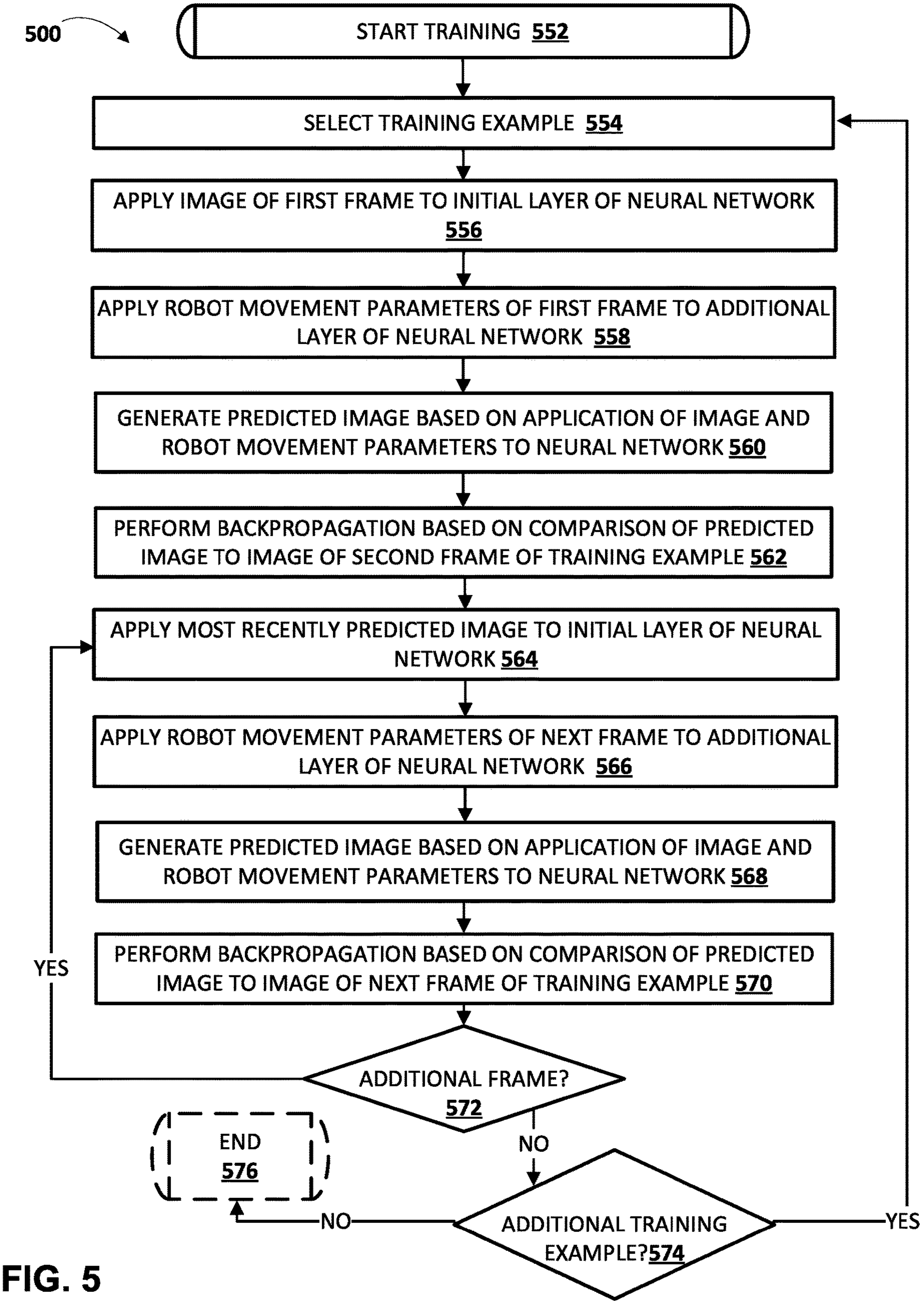
FIG. 5 is a flow chart illustrating an example method of training a neural network based on training examples.

FIG. 5 is a flowchart illustrating an example method 500 of training a neural network based on training examples. For convenience, the operations of the flow chart are described with reference to a system that performs the operations. This system may include one or more components of a computer system, such as a processor (e.g., a GPU) of training engine 120 and/or other computer system operating over the neural network (e.g., over neural network 125). Moreover, while operations of method 500 are shown in a particular order, this is not meant to be limiting. One or more operations may be reordered, omitted or added.

At block 552, the system starts training. At block 554, the system selects a training example. For example, the system may select a training example generated based on the method 400 of FIG. 4.

At block 556, the system applies an image of a first frame of the selected training example to an initial layer of a neural network. For example, the system may apply the image of the first frame to an initial convolutional layer of the neural network. As described herein, in some implementations the training example may optionally include an additional image that at least partially omits the end effector and/or other robot components. In some of those implementations, the system concatenates the image of the first frame and the additional image and applies the concatenated image to the initial layer. In some other of those implementations, the image of the first frame is already concatenated with the additional image in the training example.

At block 558, the system applies the robot movement parameters of the first frame to an additional layer of the neural network. For example, the system may apply the robot movement parameters of the first frame to an additional layer (e.g., a convolutional LSTM layer) of the neural network that is downstream of the initial layer to which the image is applied at block 556. As described herein, the robot movement parameters of the first frame can include the robot state at a time step of the initial frame, and an action to be performed at the time step of the initial frame.

At block 560, the system generates a predicted image over the neural network based on the applied image and the applied robot movement parameters. Generating the predicted image will be dependent on the structure of the neural network and can include one or more of the techniques described herein with respect to the DNA, CDNA, and STP variations of the neural network.

At block 562, the system performs backpropagation and/or other training techniques on the neural network based on comparison of the predicted image to the image of the second frame of the training example. In some implementations, the system determines an $I_2$ reconstruction loss based on the comparison, and updates the neural network based on the $I_2$ reconstruction loss.

At block 564, the system applies the most recently predicted image as input to the initial layer of the neural network. In an initial iteration of block 564, this is the predicted image of block 560. In some implementations, at block 564 the system may instead apply, as input to the additional layer of the neural network, the image of the frame of the training example that corresponds to the most recently predicted image. In an initial iteration of block 564, this would be the image of the second frame of the training example.

At block 566, the system applies the robot movement parameters of the next frame to an additional layer of the neural network. In an initial iteration of block 564, this would be the robot movement parameters of the second frame.

At block 568, the system generates a predicted image based on the application of the image and the applied robot movement parameters to the neural network. Generating the predicted image will be dependent on the structure of the neural network and can include one or more of the techniques described herein with respect to the DNA, CDNA, and STP variations of the neural network.

At block 570, the system performs backpropagation and/or other training techniques on the neural network based on comparison of the predicted image to the image of the next frame of the training example. In an initial iteration of block 570, the image of the next frame would be the image of the third frame. In some implementations, the system determines an $I_2$ reconstruction loss based on the comparison, and updates the neural network based on the $I_2$ reconstruction loss.

At block 572, the system determines whether there is an additional frame to consider in the training example. For example, if the training is for eight iterations, the system can determine there is an additional frames to consider if eight frames have yet to be considered. If the system determines at block 572 that there is an additional frame to consider, the system proceeds back to block 564 and performs another iteration of blocks 564, 566, 568, 570, and 572.

If the system determines at block 572 that there is not an additional frame to consider, the system proceeds to block 574. At block 574, the system determines if there are additional training examples. If the system determines there are additional training examples, the system returns to block 554 and selects another training example. In some implementations, determining whether there are additional training examples may include determining whether there are any remaining training examples that have not been utilized to train the neural network. In some implementations, determining whether there are additional training examples may additionally and/or alternatively include determining whether a threshold number of training examples have been utilized and/or other criteria has been satisfied.

If the system determines there are not additional training examples and/or that some other criteria has been met, the system proceeds to block 576.

At block 576, the training of the neural network may end. The trained neural network may then be provided for use by one or more robots in determining one or more movements to perform in an environment. For example, a robot may utilize the trained neural network in performing the method 700 of FIG. 7.

FIGS. 6A and 6B illustrates an architecture of an example neural network 600, illustrates example inputs that may be provided to the neural network, illustrates example outputs of the neural network 600, and illustrates how the example outputs may be utilized to generate a predicted image. The neural network 600 of FIGS. 6A and 6B is an example of a neural network that may be trained based on the method 500 of FIG. 5. The neural network 600 of FIGS. 6A and 6B is further an example of a neural network that, once trained, may be utilized in implementations of the method 700 of FIG. 7.

The example neural network 600 of FIGS. 6A and 6B is an example of the CDNA motion prediction model. The example neural network 600 can be the neural network 125 of FIG. 1, and is one of the three proposed motion prediction models described herein. In the neural network 600 of FIGS. 6A and 6B, convolutional layer 661, convolutional LSTM layers 672-677, and convolutional layer 662 are utilized to process an image 601 (e.g., a camera captured image in an initial iteration, and a most recently predicted image in subsequent iterations). An output of ten normalized CDNA transformation kernels 682 are generated as output over the smallest dimension layer (convolutional LSTM layer 675) of the network, and an output of compositing masks 684 (e.g., an 11 channel mask) are generated as output over the last layer (convolutional layer 62). As described herein, the compositing masks 684 can include one channel for static background, and ten additional channels (each corresponding to a transformed image to be generated based on a corresponding one of the ten CDNA transformation kernels 682). The CDNA kernels 682 are applied to transform 693 the image 601 (e.g., a camera captured image in an initial iteration, and a most recently predicted image in subsequent iterations) into ten different transformed images 683. The ten different transformed images are composited, at masked compositing 694, according to the compositing masks 684 to generate a predicted image 685. The transform 693 of the image 601 into ten different transformed images 683 may include convolving the image 601 based on the CDNA kernels 682 (e.g., convolving the image 601 based on a first of the CDNA kernels 682 to generate a first of the transformed images 683, convolving the image 601 based on a second of the CDNA kernels to generate a second of the transformed images 683, etc.). The compositing masks 684 sum to one at each pixel due to an applied channel-wise softmax.

Various skip connections are illustrated in FIGS. 6A and 6B. In particular, a skip connection from the output of convolutional LSTM layer 673 to the input of convolutional LSTM layer 677, and a skip connection from the output of convolutional LSTM layer 671 to the input of convolutional layer 662. Example dimensions of the various layers and outputs are also illustrated. For example, image 601 can be 64 pixels by 64 pixels, and include 3 channels (as indicated by "64×64×4"). Also, for example, convolutional LSTM layer 675 can be of an 8 by 8 dimension (as indicated by "8×8"), and apply 5 by 5 convolutions (as indicated by "5×5").

Additional description of the example neural network 600 is now provided. The neural network 600 includes a core trunk made up of one stride-2 5×5 convolutional layer 661, followed by convolutional LSTM layers 671-677. Each of the convolutional LSTM layers 671-677 has weights arranged into 5×5 convolutions, and the output of the preceding LSTM is fed directly into the next one. Convolutional LSTM layers 673 and 675 are preceded by stride 2 downsampling to reduce resolution, and convolutional LSTM layers 675, 676, and 677 are preceded by upsampling. The end of the LSTM stack is followed by an upsampling stage and a final convolutional layer 662, which then outputs full-resolution compositing masks 684 for compositing the various transformed images 683 and compositing against the static background. The masked compositing 694 can use the compositing masks 684 and the transformed images 683 to generate the predicted image 685. It is noted that in the case of an STP motion prediction model, masks will also be generated for compositing various transformed images (generated based on the transformation matrices), and in the case of both the STP and the DNA, a compositing mask will be generated for compositing against the static background.

To preserve high-resolution information, a skip connection from the output of convolutional LSTM layer 671 to the input of convolutional layer 662, and a skip connection from the output of convolutional LSTM layer 673 to the input of convolutional LSTM layer 677 are provided. The skip connections concatenate the skip layer activations and those of the preceding layer before sending them to the following layer. For example, the input to convolutional LSTM layer 677 consists of the concatenation of the output from convolutional LSTM layer 673 and the output from convolutional LSTM layer 676. The model also includes, as input, robot movement parameters of the robot state 602 (e.g., gripper pose) and robot action 603 (e.g., gripper motion command). For example, the robot state 602 can be five dimensions, with values for vector (x, y, z) and angles (pitch, yaw). The robot action can also be five dimensions, and can be the values for vector and angles for a subsequent (e.g., next) time step if the action is applied and/or a motion vector if the action is applied. For example, the robot action can be the vector (x, y, z) and angles (pitch, yaw) for a commanded gripper pose. The commanded gripper pose can be the commanded gripper pose of the next time step, or a further time step (e.g., the target pose for the gripper at the final time step). The robot state 602 and robot action 603 vectors are first tiled into an 8×8 response map 681 with 10 channels, and then concatenated, channel-wise at 693, to the input of convolutional LSTM layer 675 (concatenated with the output from the convolutional LSTM layer 674. The robot state 602 at a current iteration can be a current robot state, and the robot state 602 at subsequent iterations can be predicted linearly from the preceding current robot state and preceding robot action, though additional or alternative robot state prediction models could be used.

In the case of the action-conditioned robot manipulation task, all three models (DNA, CDNA, and STP) include as input the current state (e.g., gripper pose) and action (e.g., gripper motion command) of the robot. The three models differ in the form of the transformation that is applied to the previous image. The object-centric CDNA and STP models output the transformation parameters after convolutional LSTM layer 675. In both cases, the output of convolutional LSTM layer 675 is flattened and linearly transformed, either directly into filter parameters in the case of the CDNA, or through one 100-unit hidden layer in the case of the STP. There can be 10 CDNA filters in the case of CDNA, which can be 5×5 in size and normalized to sum to 1 via a spatial softmax, so that each filter represents a distribution over positions in the previous image from which a new pixel value can be obtained. The STP parameters can correspond to 10 3×2 affine transformation matrices. The transformations are applied to the preceding image to create 10 separate transformed images. The CDNA transformation corresponds to a convolution (though with the kernel being an output of the network), while the STP transformation is an affine transformation. The DNA model differs from the other two in that the transformation parameters are output at the last convolutional layer 662, in the same place as the mask. This is because the DNA model outputs a transformation map as large as the entire image. For each image pixel, the DNA model outputs a 5×5 convolutional kernel that can be applied to the previous image to obtain a new pixel value, similarly to the CDNA model. However, because the kernel is spatially-varying, this model is not equivalent to the CDNA. This transformation only produces one transformed image. After transformation, the transformed image(s) and the previous image are composited together based on the mask. The previous image is included as a static "background" image and, as described herein, the mask on the background image tends to pick out static parts of the scene. The final image is formed by multiplying each transformed image and the background image by their mask values, and adding all of the masked images together.

Although a particular convolutional neural network is illustrated in FIGS. 6A and 6B, variations are possible. For example, more or fewer LSTM layers may be provided, one or more layers may be different sizes than those provided as examples, etc. Also, for example, alternative predicted transformation and/or compositing masks may be generated over the model.

Figure 7:
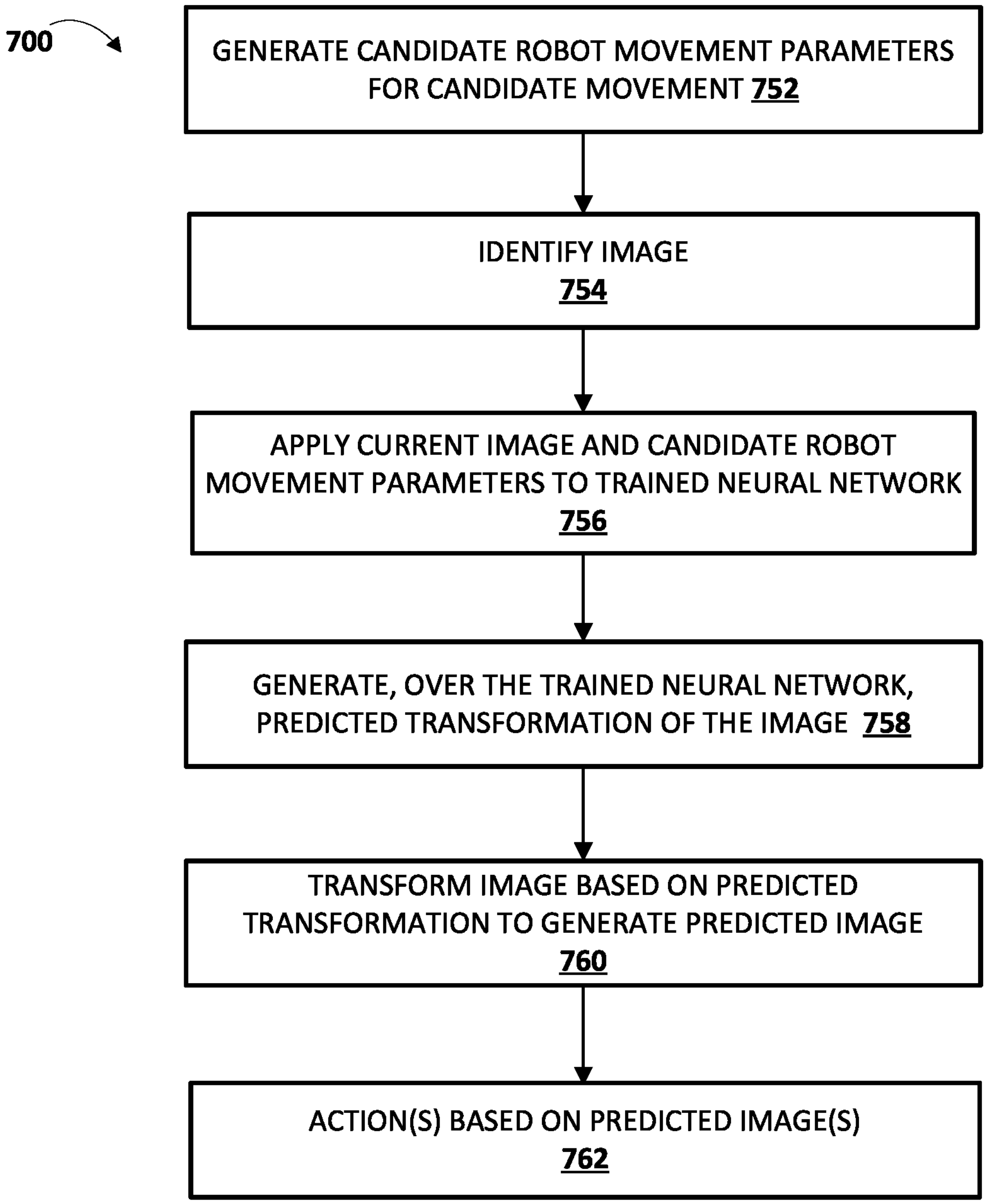
FIG. 7 is a flowchart illustrating an example method of utilizing a trained neural network to generate predicted image(s) that predict a robot's environment after movement of the robot occurs and/or performing one or more actions based on the predicted images.

Once the neural network of FIGS. 6A and 6B or other neural network is trained according to techniques described herein, it may be utilized for various purposes. With reference to FIG. 7, a flowchart is illustrated of an example method 700 of utilizing a trained neural network to generate predicted image(s) that predict a robot's environment after movement of the robot occurs and/or performing one or more actions based on the predicted images. For convenience, the operations of the flow chart are described with reference to a system that performs the operations. This system may include one or more components of a robot, such as a processor (e.g., CPU and/or GPU) and/or robot control system of robot 180A, 180B, 840, and/or other robot. In implementing one or more blocks of method 700, the system may operate over a trained neural network which may, for example, be stored locally at a robot and/or may be stored remote from the robot. Moreover, while operations of method 700 are shown in a particular order, this is not meant to be limiting. One or more operations may be reordered, omitted or added.

At block 752, the system generates candidate robot movement parameters for at least a portion of a candidate movement of a robot. The candidate robot movement parameters can include, for example, a current robot state (e.g., the current robot state or an initial robot state of the candidate robot movement parameters), and one or more actions to be performed (e.g., a commanded robot state). The candidate robot movement parameters define at least a portion of a candidate movement performable (but not yet performed) by one or more components of the robot in an environment of the robot. For example, the movement may include movement of an end effector of the robot from a first pose to a second pose and the candidate robot movement parameters may define various parameters associated with the movement from the first pose to the second pose, or parameters associated with the movement from the first pose to intermediate pose(s) between the first pose and the second pose. For instance, the candidate robot movement parameters may define only a portion of (e.g., only a percentage of the first part of or only the first X time steps of) a candidate movement.

The movement parameters may include, for example, joint-space motion vectors (e.g., joint angle movements) to accomplish the portion of the candidate movement, the transformation of the pose of the end effector over the portion of the candidate movement, joint-space torque vectors to accomplish the portion of the candidate movement, and/or other parameters. It is noted that the particular movement parameters and/or the form of the movement parameters will be dependent on the input parameters of the trained neural network utilized in further blocks.

In some implementations, the candidate movement is generated by another system and candidate robot movement parameters for the candidate movement are applied to the neural network in method 700 to determine how the candidate movement will affect object(s) in the environment if implemented. In some of those implementations, the candidate movement may be implemented based on how it will affect object(s), may be refined based on how it will affect object(s), or may not be implemented based on how it will affect object(s). In some implementations, the system generates a plurality of distinct candidate movements and applies candidate robot movement parameters for each of them to the neural network in multiple iterations of method 700 to determine how each will affect object(s) in the environment. In some of those implementations, one of the movements may be selected for implementation based on how they will affect object(s).

At block 754, the system identifies an image that captures one or more environmental objects in an environment of the robot. In some implementations, such as a first iteration of method 700 for a portion of a candidate movement, the image is a current image. In some implementations, the system also identifies an additional image that at least partially omits the end effector and/or other robot components, such as an additional image of the environmental objects that was captured by a vision sensor when the end effector was at least partially out of view of the vision sensor. In some implementations, the system concatenates the image and the additional image to generate a concatenated image. In some implementations, the system optionally performs processing of the image(s) and/or concatenated image (e.g., to size to an input of the neural network).

At block 756, the system applies the image and the candidate robot movement parameters (e.g., a candidate robot state and candidate action(s)) to a trained neural network. For example, the system may apply the image to an initial layer of the trained neural network. The system may also apply the current robot state and the candidate robot movement parameters to an additional layer of the trained neural network that is downstream of the initial layer.

At block 758, the system generates, over the trained neural network, a predicted transformation of the image of block 754. The predicted transformation is generated based on the applying of the image and the candidate robot movement parameters (along with the current robot state) to the trained neural network at block 756 and determining the predicted transformation based on the learned weights of the trained neural network.

At block 760, the system transforms the image, based on the predicted transformation of block 758, to generate a predicted image. For example, where the predicted transformation of block 758 includes parameters of one or more spatial transformers, the system may apply the one or more spatial transformers to the current image utilizing the parameters. Also, for example, where the predicted transformation of block 758 includes one or more normalized distributions each corresponding to one or more of the pixels, transforming the current image may include applying the normalized distribution to the current image using a convolution operation. In some of those implementations, each of the normalized distributions corresponds to a corresponding one of the pixels. Compositing mask(s) may also be utilized as described herein, wherein the parameters of the compositing mask(s) are generated based on the applying of the image (and optionally the additional image) and the candidate robot movement parameters to the trained neural network at block 756. For example, compositing mask can be utilized to generate a single predicted image from multiple transformed images generated using a CDNA and/or STP model as described herein. Moreover, the compositing mask(s) can include a background mask that can be applied to the current image to copy pixels from the current image in generating the predicted image.

The predicted image predicts the portion of the environment captured by the image if the at least a portion of the candidate movement indicated by the parameters of block 752 is performed in the environment by the components of the robot. In other words, where the at least the portion of the candidate movement would cause motion of one or more object(s) in the environment, the predicted image may represent the object(s) after the motion.

In some implementations, the system determines if there are additional candidate robot movement parameters to consider for the candidate movement. For example, the system may determine if there is another portion of the candidate movement to consider and, if so, the system proceeds back to block 752 and generates candidate robot movement parameters for that portion, then proceeds to block 754 and identifies an image, then proceeds to blocks 756-758 and generates another predicted image based on the additional candidate robot movement parameters. In some implementations, the image identified at an additional iteration of block 754 is the predicted image generated in an immediately preceding iteration of block 760. This process may repeat, each time utilizing the predicted image from an immediately preceding iteration as the image identified at that iteration of block 754 and applied at that iteration of block 756, thereby enabling predicted images to be generated for each of multiple time steps in the future. In this manner, the predicted images may be utilized to determine motion of object(s) over multiple time steps, conditioned on a current image and based on candidate robot movement parameters.

At block 762, the system performs one or more actions based on the predicted images and optionally based on the "current image". For example, the system may determine, based on comparing the predicted image to the current image, that the motion caused by the candidate movement is desirable. Based on determining the motion is desirable, the system may perform the candidate movement by, for example, providing one or more control commands to one or more actuators of the robot to effectuate the candidate movement. Also, for example, where multiple predicted images are determined for a candidate movement the system may determine, based on the predicted images and/or the current image, that the motion caused by the candidate movement is desirable. Based on determining the motion is desirable, the system may perform the candidate movement by, for example, providing one or more control commands to one or more actuators of the robot to effectuate the candidate movement.

In some implementations, one or more iterations of blocks 752-760 are performed for one or more additional candidate movements and at block 764 the system may select one of the candidate movements based on the predicted images for those iterations. For example, one or more iterations of blocks 752-760 may be performed for a first candidate movement and separately performed for a second candidate movement. The system may select one of the first candidate movement and the second candidate movement based on predicted image(s) for the first candidate movement and predicted image(s) for the second candidate movement. The system may perform the selected candidate movement by providing one or more corresponding control commands to one or more actuators of the robot.

Figure 8:
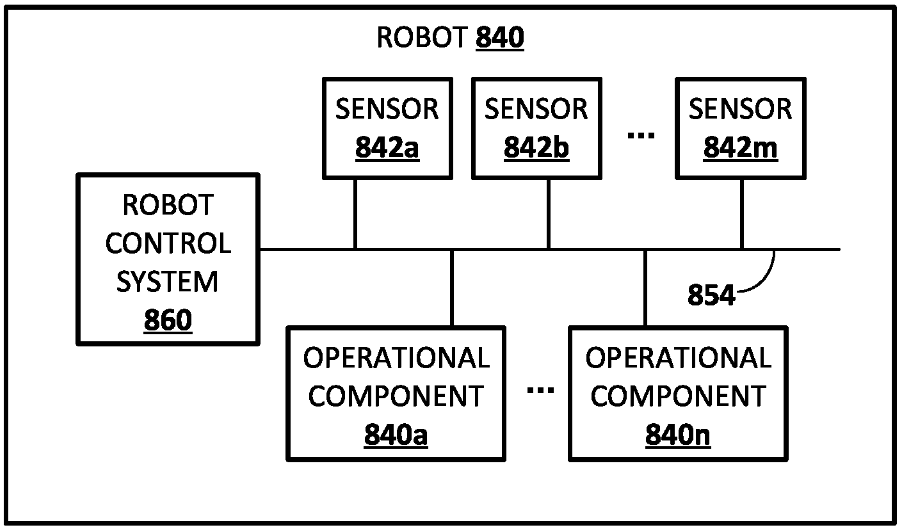
FIG. 8 schematically depicts an example architecture of a robot.

FIG. 8 schematically depicts an example architecture of a robot 840. The robot 840 includes a robot control system 860, one or more operational components 840*a*-840*n*, and one or more sensors 842*a*-842*m*. The sensors 842*a*-842*m* may include, for example, vision sensors, light sensors, pressure sensors, pressure wave sensors (e.g., microphones), proximity sensors, accelerometers, gyroscopes, thermometers, barometers, and so forth. While sensors 842*a*-*m* are depicted as being integral with robot 820, this is not meant to be limiting. In some implementations, sensors 842*a*-*m* may be located external to robot 820, e.g., as standalone units.

Operational components 840*a*-840*n* may include, for example, one or more end effectors and/or one or more servo motors or other actuators to effectuate movement of one or more components of the robot. For example, the robot 820 may have multiple degrees of freedom and each of the actuators may control actuation of the robot 820 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 860 may be implemented in one or more processors, such as a CPU, GPU, and/or other controller(s) of the robot 820. In some implementations, the robot 820 may comprise a "brain box" that may include all or aspects of the control system 860. For example, the brain box may provide real time bursts of data to the operational components 840*a*-*n*, with each of the real time bursts comprising a set of one or more control commands that dictate, inter alia, the parameters of motion (if any) for each of one or more of the operational components 840*a*-*n*. In some implementations, the robot control system 860 may perform one or more aspects of methods 300, 400, 500, and/or 700 described herein.

As described herein, in some implementations all or aspects of the control commands generated by control system 860 in moving one or more components of a robot may be based on predicted image(s) generated utilizing predicted transformation(s) determined via a trained neural network. For example, a vision sensor of the sensors 842*a*-*m* may capture a current image, and the robot control system 860 may generate candidate robot movement parameters. The robot control system 860 may provide the current image and candidate robot movement parameters to a trained neural network, generate a predicted transformation based on the applying, may generate a predicted image based on the predicted transformation, and utilize the predicted image to generate one or more end effector control commands for controlling the movement of the robot. Although control system 860 is illustrated in FIG. 8 as an integral part of the robot 820, in some implementations, all or aspects of the control system 860 may be implemented in a component that is separate from, but in communication with, robot 820. For example, all or aspects of control system 860 may be implemented on one or more computing devices that are in wired and/or wireless communication with the robot 820, such as computing device 910.

Figure 9:
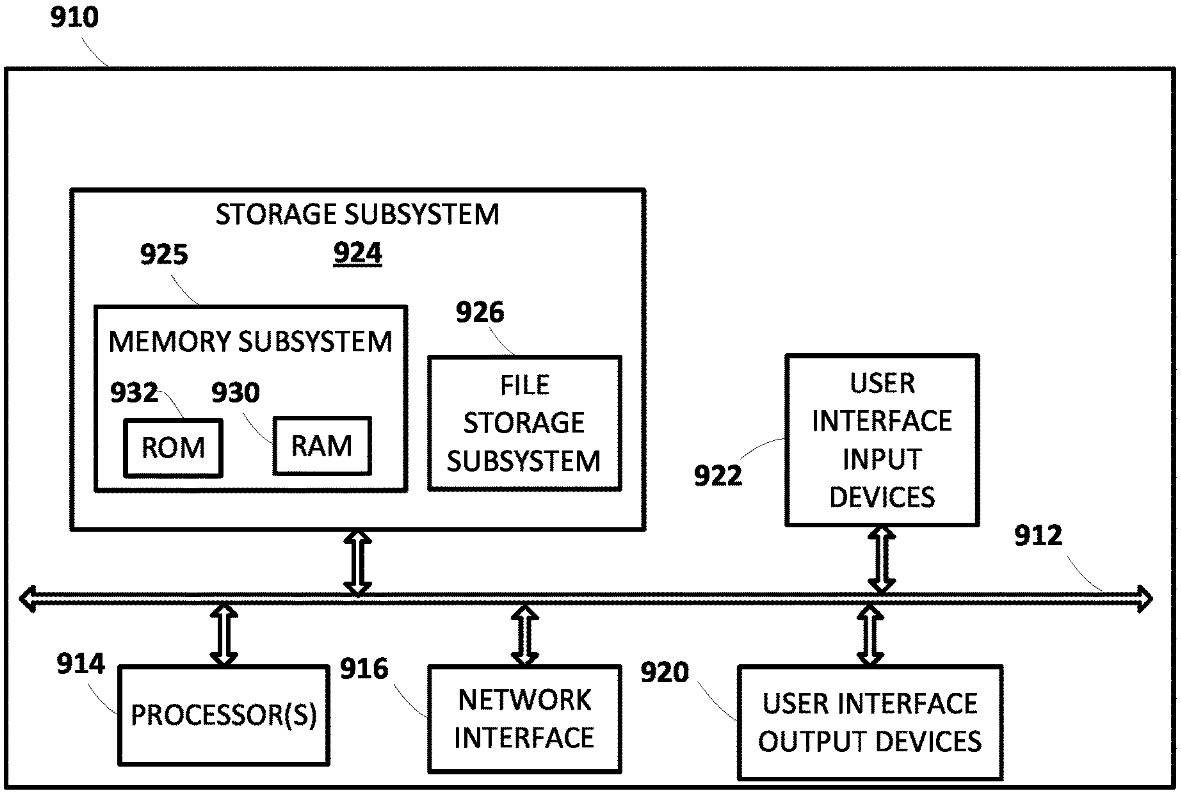
FIG. 9 schematically depicts an example architecture of a computer system.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method of FIGS. 3, 4, 5, and/or 7.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:

generating candidate robot movement parameters, the candidate robot movement parameters defining at least a portion of a candidate movement performable in an environment of a robot by one or more components of the robot;

identifying a current image captured by a vision sensor associated with the robot, the current image capturing at least a portion of the environment of the robot;

applying the current image and the candidate robot movement parameters as input to a trained neural network;

generating at least one predicted transformation of the current image, the predicted transformation indicating pixel motion predictions and being generated based on the application of the current image and the candidate robot movement parameters to the trained neural network;

transforming the current image to generate at least one predicted image, wherein transforming the current image comprises applying, to the current image, the at least one predicted transformation generated based on the application of the current image and the candidate robot movement parameters to the trained neural network, the predicted image predicting the portion of the environment of the robot were the at least the portion of the candidate movement performed in the environment by the components of the robot;

determining, based on the predicted image, to perform a second candidate movement in lieu of the candidate movement;

generating second candidate robot movement parameters, the second candidate robot movement parameters defining at least a portion of the second candidate movement;

applying the current image and the second candidate robot movement parameters as input to the trained neural network;

generating at least one second predicted transformation of the current image, the second predicted transformation being generated based on the application of the current image and the second candidate robot movement parameters to the trained neural network;

transforming one or more pixels of the current image based on the second predicted transformation to generate at least one second predicted image, the second predicted image predicting the portion of the environment of the robot if the at least the portion of the second candidate movement is performed in the environment by the components of the robot;

selecting the second candidate movement based on the second predicted image; and providing one or more control commands to one or more actuators of the robot to perform the second candidate movement.

2. The method of claim 1, further comprising:

identifying a current state of the robot; and applying the current state as additional input to the trained neural network along with the current image and the candidate robot movement parameters, wherein the predicted transformation is further generated based on the application of the current state to the trained neural network.

3. The method of claim 2, wherein the current state of the robot comprises a current end effector pose of an end effector of the robot.

4. The method of claim 1, further comprising:

generating at least one compositing mask based on the application of the current image and the candidate robot movement parameters to the trained neural network;

wherein transforming the current image is further based on the at least one compositing mask.

5. The method of claim 4, wherein the at least one predicted transformation comprises a plurality of predicted transformations, wherein the at least one compositing mask comprises a plurality of compositing masks, and wherein transforming the current image based on the at least one predicted transformation to generate the predicted image comprises:

generating a plurality of predicted images based on the plurality of predicted transformations; and compositing the predicted images based on the plurality of compositing masks to generate the predicted image.

6. The method of claim 1, further comprising:

generating continuing candidate robot movement parameters, the continuing candidate robot movement parameters defining another portion of the second candidate movement that follows the portion of the second candidate movement;

applying the predicted image and the continuing candidate robot movement parameters to the trained neural network;

generating at least one continuing predicted transformation of the predicted image, the continuing predicted transformation being generated based on the application of the predicted image and the continuing candidate robot movement parameters to the trained neural network; and transforming the predicted image based on the continuing predicted transformation to generate a continuing predicted image.

7. The method of claim 6, further comprising:

selecting the second candidate movement further based on the continuing predicted image.

8. The method of claim 1, wherein the trained neural network comprises a plurality of stacked convolutional long short-term memory layers.

9. The method of claim 1, wherein the at least one predicted transformation of pixels of the current image comprises parameters of one or more spatial transformers.

10. The method of claim 9, wherein transforming the current image comprises: applying the one or more spatial transformers to the current image utilizing the parameters.

11. The method of claim 1, wherein the at least one predicted transformation of pixels of the current image comprises one or more normalized distributions each corresponding to one or more of the pixels.

12. The method of claim 11, wherein transforming the current image comprises:

applying the one or more normalized distributions to the current image using a convolution operation.

13. The method of claim 11, wherein each of the one or more normalized distributions corresponds to a corresponding one of the pixels.

14. The method of claim 1, wherein applying the current image and the candidate robot movement parameters as input to the trained neural network comprises:

applying the current image as input to an initial layer of the trained neural network; and applying the candidate robot movement parameters to an additional layer of the trained neural network, the additional layer being downstream of the initial layer.

15. A system comprising:

memory storing instructions; and one or more processors operable to execute the instructions to:

generate candidate robot movement parameters, the candidate robot movement parameters defining at least a portion of a candidate movement performable in an environment of a robot by one or more components of the robot;

identify a current image captured by a vision sensor associated with the robot, the current image capturing at least a portion of the environment of the robot;

apply the current image and the candidate robot movement parameters as input to a trained neural network;

generate at least one predicted transformation of the current image, the predicted transformation indicating pixel motion predictions and being generated based on the application of the current image and the candidate robot movement parameters to the trained neural network;

transform the current image to generate at least one predicted image, wherein in transforming the current image, one or more of the processors are to apply, to the current image, the at least one predicted transformation generated based on the application of the current image and the candidate robot movement parameters to the trained neural network, the predicted image predicting the portion of the environment of the robot were the at least the portion of the candidate movement performed in the environment by the components of the robot;

determine, based on the predicted image, to perform a second candidate movement in lieu of the candidate movement;

generate second candidate robot movement parameters, the second candidate robot movement parameters defining at least a portion of the second candidate movement;

apply the current image and the second candidate robot movement parameters as input to the trained neural network;

generate at least one second predicted transformation of the current image, the second predicted transformation being generated based on the application of the current image and the second candidate robot movement parameters to the trained neural network;

transform one or more pixels of the current image based on the second predicted transformation to generate at least one second predicted image, the second predicted image predicting the portion of the environment of the robot if the at least the portion of the second candidate movement is performed in the environment by the components of the robot;

select the second candidate movement based on the second predicted image; and provide one or more control commands to one or more actuators of the robot to perform the second candidate movement.

16. The system of claim 15, wherein one or more of the processors are further to:

identify a current state of the robot; and apply the current state as additional input to the trained neural network along with the current image and the candidate robot movement parameters, wherein the predicted transformation is further generated based on the application of the current state to the trained neural network.

17. The system of claim 16, wherein the current state of the robot comprises a current end effector pose of an end effector of the robot.

18. The system of claim 15, wherein one or more of the processors are further to:

generate at least one compositing mask based on the application of the current image and the candidate robot movement parameters to the trained neural network;

wherein transforming the current image is further based on the at least one compositing mask.

19. The system of claim 18, wherein the at least one predicted transformation comprises a plurality of predicted transformations, wherein the at least one compositing mask comprises a plurality of compositing masks, and wherein in transforming the current image based on the at least one predicted transformation to generate the predicted image, one or more of the processors are to:

generate a plurality of predicted images based on the plurality of predicted transformations; and composite the predicted images based on the plurality of compositing masks to generate the predicted image.

20. The system of claim 15, wherein one or more of the processors are further to:

generate continuing candidate robot movement parameters, the continuing candidate robot movement parameters defining another portion of the second candidate movement that follows the portion of the second candidate movement;

apply the predicted image and the continuing candidate robot movement parameters to the trained neural network;

generate at least one continuing predicted transformation of the predicted image, the continuing predicted transformation being generated based on the application of the predicted image and the continuing candidate robot movement parameters to the trained neural network; and transform the predicted image based on the continuing predicted transformation to generate a continuing predicted image.

* * * * *